US012100347B2

(12) United States Patent
Kim et al.

(10) Patent No.: US 12,100,347 B2
(45) **Date of Patent: *Sep. 24, 2024**

(54) DISPLAY DEVICE AND DRIVING METHOD OF THE DISPLAY DEVICE

(71) Applicant: Samsung Display Co., Ltd., Yongin-Si (KR)

(72) Inventors: Boyeon Kim, Yongin-si (KR); Wheewon Lee, Yongin-si (KR); Wontae Kim, Yongin-si (KR); Jaehan Lee, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/118,750

(22) Filed: Mar. 8, 2023

(65) Prior Publication Data

US 2023/0222973 A1 Jul. 13, 2023

Related U.S. Application Data

(63) Continuation of application No. 17/246,772, filed on May 3, 2021, now Pat. No. 11,605,339.

(30) Foreign Application Priority Data

Oct. 15, 2020 (KR) ........................ 10-2020-0133744

(51) Int. Cl.
*G09G 3/32* (2016.01)
*G09G 3/3225* (2016.01)

(52) U.S. Cl.
CPC ... *G09G 3/3225* (2013.01); *G09G 2300/0413* (2013.01); *G09G 2360/147* (2013.01)

(58) Field of Classification Search
CPC ......... G09G 3/3225; G09G 2300/0413; G09G 2360/147
See application file for complete search history.

(56) References Cited

U.S. PATENT DOCUMENTS

2009/0284519 A1 11/2009 Kim et al.
2010/0073346 A1 3/2010 Min et al.
2011/0084955 A1 4/2011 Kim
(Continued)

FOREIGN PATENT DOCUMENTS

KR 10-2009-0119810 A 11/2009
KR 10-2011-0039773 A 4/2011
(Continued)

*Primary Examiner* — Towfiq Elahi
(74) *Attorney, Agent, or Firm* — Innovation Counsel LLP

(57) ABSTRACT

A display device includes a display panel including a plurality of sensing lines and a plurality of pixels each connected to a corresponding sensing line among the plurality of sensing lines, a sensor that senses characteristic information of the plurality of pixels through the plurality of sensing lines and converts the characteristic information into sensing data having a digital format, and a compensator that converts first data received from outside of the display device into second data based on the sensing data, wherein the sensor senses characteristic information of pixels arranged in a partial area of the display panel during a transition period of a sensing period and processes sensed characteristic information as dummy data.

17 Claims, 16 Drawing Sheets

(56) References Cited

U.S. PATENT DOCUMENTS

| | | | |
|---|---|---|---|
| 2016/0140898 A1 | 5/2016 | Hyun et al. | |
| 2017/0102824 A1 | 4/2017 | Kang et al. | |
| 2018/0013085 A1 * | 1/2018 | Shin | H04N 23/84 |
| 2018/0075798 A1 | 3/2018 | Nho et al. | |
| 2018/0122302 A1 | 5/2018 | Koong | |
| 2019/0130813 A1 | 5/2019 | Fang et al. | |
| 2020/0202776 A1 | 6/2020 | Liang et al. | |
| 2021/0072859 A1 | 3/2021 | Liang et al. | |

FOREIGN PATENT DOCUMENTS

| | | | |
|---|---|---|---|
| KR | 10-2011-0057552 | A | 6/2011 |
| KR | 10-2014-0133702 | A | 11/2014 |
| KR | 10-2015-0079306 | A | 7/2015 |
| KR | 10-1721507 | B1 | 3/2017 |
| KR | 10-2018-0047242 | A | 5/2018 |
| KR | 10-1888075 | B1 | 9/2018 |
| KR | 10-2019-0048806 | A | 5/2019 |

* cited by examiner

DISPLAY DEVICE AND DRIVING METHOD OF THE DISPLAY DEVICE

CROSS-REFERENCE TO RELATED APPLICATION

This application is a continuation application of U.S. patent application Ser. No. 17/246,772 filed on May 3, 2021, which claims priority under 35 U.S.C. § 119 to Korean Patent Application No. 10-2020-0133744, filed on Oct. 15, 2020, in the Korean Intellectual Property Office, the disclosure of which is incorporated by reference herein in its entirety.

BACKGROUND

1. Field

One or more embodiments relate to a display device and a driving method of the display device.

2. Description of Related Art

Each of pixels provided in a display device receives a data signal from a corresponding data line in response to a scan signal supplied from a corresponding scan line, and emit light having a brightness corresponding to the data signal.

In order for a display device to display an image of uniform quality, each of the pixels has to emit the same light in response to a same data signal. However, the characteristic of internal elements such as driving transistors and/or organic light-emitting diodes included in each of the pixels may have deviation in their own characteristic.

In addition, the internal elements deteriorate their characteristic as using time increases. As a result, a characteristic deviation occurs between the pixels, and this characteristic deviation may deteriorate image quality of the display device.

SUMMARY

One or more embodiments include a display device capable of effectively compensating for a characteristic deviation between pixels to improve image quality, and a driving method of the display device.

Additional aspects will be set forth in part in the description which follows and, in part, will be apparent from the description, or may be learned by practice of the presented embodiments of the disclosure.

According to one or more embodiments, a display device, which is driven to have a driving period and a sensing period including a transition period and an effective period following the transition period, includes a display panel including a plurality of sensing lines and a plurality of pixels each connected to a corresponding sensing line among the plurality of sensing lines, a sensor that senses characteristic information of the plurality of pixels through the plurality of sensing lines and converts the characteristic information into sensing data having a digital format, and a compensator that converts first data received from outside of the display device into second data based on the sensing data, wherein the sensor senses characteristic information of pixels arranged in a partial area of the display panel during the transition period and processes the sensed characteristic information as dummy data.

The display panel may include a display area and a non-display area around the display area, the non-display area including a dummy area, wherein the sensor may sense characteristic information of dummy pixels arranged in the dummy area during the transition period and process the sensed characteristic information of the dummy pixels as dummy data.

The dummy area may include a plurality of dummy rows, wherein the sensor may sequentially sense dummy pixels arranged in the plurality of dummy rows one row at a time during the transition period.

The dummy area may include one dummy row, wherein the sensor may sense dummy pixels arranged in the dummy row multiple times during the transition period.

The dummy area may be adjacent to a first row of the display area.

The sensor may not output the dummy data to the compensator.

The sensor may sequentially select pixels arranged in the display area one row at a time during the effective period to sense characteristic information of the selected pixels.

The sensor may sense characteristic information of pixels arranged in a row in a display area of the display panel multiple times during the transition period and process the sensed characteristic information of the pixels as dummy data.

The sensor may sequentially select pixels arranged in the display area one row at a time during the effective period to sense characteristic information of the selected pixels.

The sensor may include a plurality of analog front ends (AFEs) respectively connected to the plurality of sensing lines and holding characteristic information of pixels in a pixel row, and an analog-to-digital converter (ADC) that is sequentially connected to the plurality of AFEs to convert the characteristic information of the pixels in the pixel row into digital sensing data.

The display device may further include a plurality of switches provided between each of the plurality of AFEs and the ADC.

The display device may further include a scan driver that applies a scan signal to the plurality of pixels, and a data driver that applies a reference voltage to the plurality of pixels during the sensing period and applies a data signal to the plurality of pixels during the driving period.

According to one or more embodiments, a display device, which is driven to have a driving period and a sensing period including a transition period and an effective period following the transition period, includes a display panel including a plurality of sensing lines and a plurality of pixels each connected to a corresponding sensing line among the plurality of sensing lines, a sensor that senses characteristic information of the plurality of pixels through the plurality of sensing lines and converts the characteristic information into sensing data having a digital format, and a compensator that converts first data received from an outside of the display device into second data based on the sensing data, wherein the sensor includes a plurality of analog front ends (AFEs) respectively connected to the plurality of sensing lines and holding characteristic information of pixels in a pixel row, an analog-to-digital converter (ADC) that is sequentially connected to the plurality of AFEs to convert the characteristic information of the pixels in the pixel row into digital sensing data, and a dummy analog front end DAFE, wherein the sensor connects the DAFE to the ADC multiple times during the transition period.

The display device may further include a plurality of switches provided between each of the plurality of AFEs and the ADC, and a dummy switch provided between the dummy AFE and the ADC.

According to one or more embodiments, a driving method of a display device, which is driven to have a driving period and a sensing period including a transition period and an effective period following the transition period, includes sensing characteristic information of a plurality of pixels each connected to a corresponding sensing line among a plurality of sensing lines and converting the characteristic information into sensing data having a digital format, and converting first data received from an outside of the display device into second data based on the sensing data, wherein the converting of the characteristic information into the sensing data includes sensing characteristic information of pixels arranged in a partial area of the display panel during the transition period and processing the sensed characteristic information as dummy data.

The display panel may include a display area and a non-display area around the display area, the non-display area including a dummy area, wherein the converting of the characteristic information into the sensing data may include sensing characteristic information of dummy pixels arranged in the dummy area during the transition period and processing the sensed characteristic information of the dummy pixels as dummy data.

The dummy area may include a plurality of dummy rows, wherein the converting of the characteristic information into the sensing data may include sequentially sensing dummy pixels arranged in the plurality of dummy rows one row at a time during the transition period and processing sensed characteristic information as dummy data.

The dummy area may include one dummy row, wherein the converting of the characteristic information into the sensing data may include sensing dummy pixels arranged in the dummy row multiple times during the transition period and processing sensed characteristic information as dummy data.

The dummy area may be adjacent to a first row of the display area.

The converting of the characteristic information into the sensing data may include sensing characteristic information of pixels arranged in a row in a display area of the display panel multiple times during the transition period and processing the sensed characteristic information of the pixels as dummy data.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
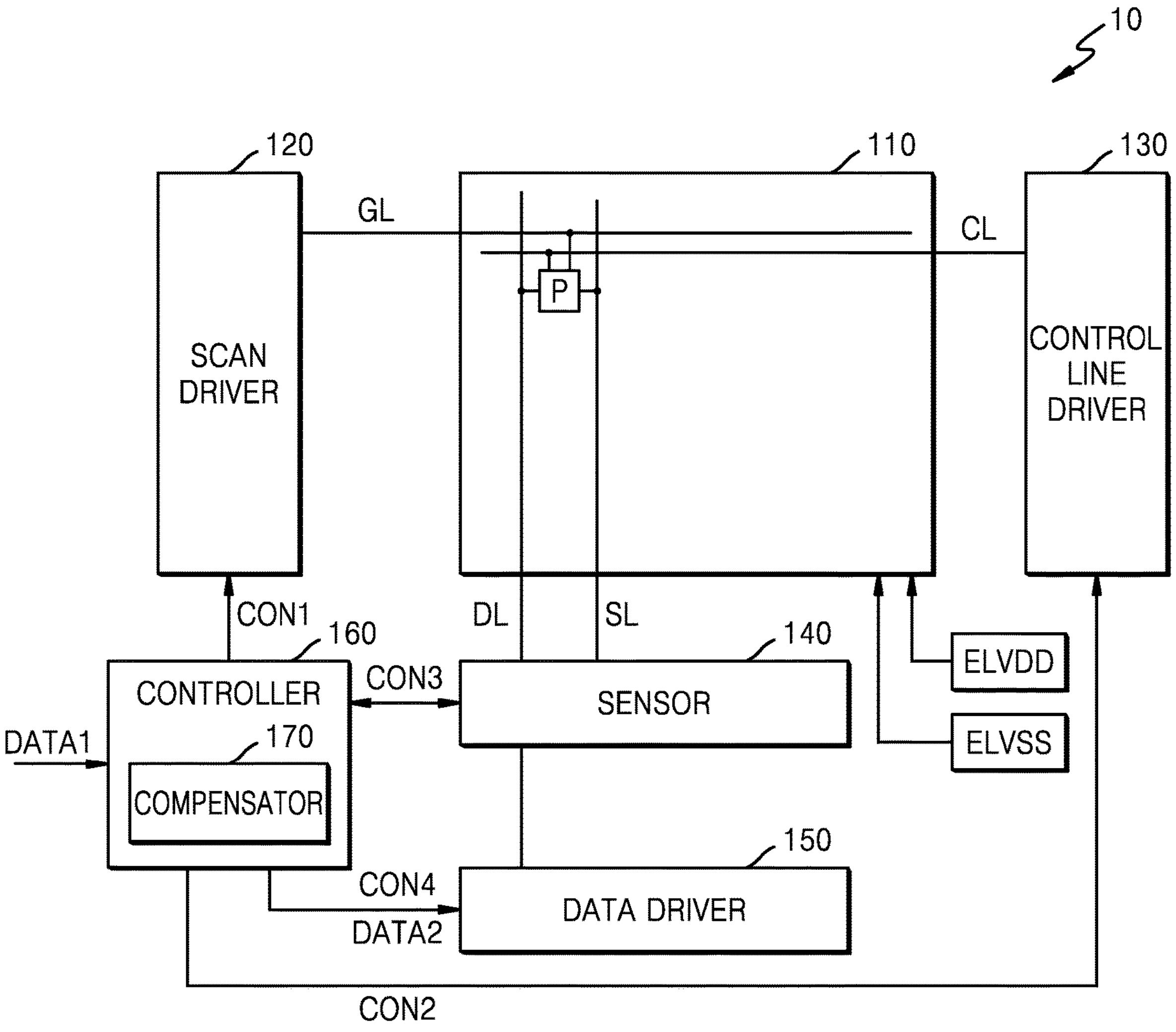
FIG. 1 is a block diagram of a display device according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b, or c" indicates only a, only b, only c, both a and b, both a and c, both b and c, all of a, b, and c, or variations thereof.

Since the disclosure may have various modifications and several embodiments, embodiments are shown in the drawings and will be described in detail. The effects and features of the disclosure, and ways to achieve them will become apparent by referring to embodiments that will be described later in detail with reference to the drawings. However, the disclosure is not limited to the following embodiments but may be embodied in various forms.

It will be understood that although the terms "first," "second," etc., may be used herein to describe various elements, these elements should not be limited by these terms. These terms are only used to distinguish one element from another.

In the embodiments below, the singular forms include the plural forms unless the context clearly indicates otherwise.

In the present specification, it is to be understood that the terms such as "including" or "having" are intended to indicate the existence of the features or elements disclosed in the specification and are not intended to preclude the possibility that one or more other features or elements may be added.

In the embodiments below, it will be understood when a portion such as a layer, an area, or an element is referred to as being "on" or "above" another portion, it can be directly on or above the other portion, or intervening portion may also be present.

Also, in the drawings, for convenience of description, sizes of elements may be exaggerated or contracted. For example, since sizes and thicknesses of elements in the drawings are arbitrarily illustrated for convenience of explanation, the following embodiments are not limited thereto.

In the present specification, "A and/or B" refers to A, B, or A and B. In addition, in the present specification, "at least one of A and B" refers to A, B, or A and B.

In the following embodiments, when X and Y are connected to each other, X and Y may be electrically connected to each other, X and Y may be functionally connected to each other, or X and Y may be directly connected to each other. Here, X and Y may be target objects (e.g., apparatuses, devices, circuits, lines, electrodes, terminals, conductive layers, or layers). Thus, the disclosure is not limited to a certain connection relationship, for example, a connection relationship indicated in the drawings or the detailed description and may also include anything other than the connection relationship indicated in the drawings or the detailed description.

For example, when X and Y are electrically connected to each other, one or more devices (e.g., switches, transistors, capacitors, inductors, resistors, or diodes) enabling the electrical connection between X and Y may be connected between X and Y.

In the following embodiments, "ON" used in connection with a device state may refer to an activated state of the device, and "OFF" may refer to a deactivated state of the device. "ON" used in connection with a signal received by a device may refer to a signal activating the device, and "OFF" may refer to a signal deactivating the device. The device may be activated by a high-level voltage or a low-level voltage. For example, a P-channel transistor may be activated by a low-level voltage, and an N-channel transistor may be activated by a high-level voltage. Thus, it should be understood that "ON" voltages for the P-channel transistor and the N-channel transistor are opposite (low versus high) voltage levels.

FIG. 1 is a block diagram of a display device according to an embodiment.

A display device 10 according to embodiments may be implemented as an electronic apparatus such as a smartphone, a mobile phone, a smart watch, a navigation apparatus, a game machine, a television (TV), a vehicle head unit, a notebook computer, a laptop computer, a tablet computer, and a personal media player (PMP), or a personal digital assistant (PDA). Also, the electronic apparatus may be a flexible apparatus.

Referring to FIG. 1, the display device 10 may include a display panel 110, a scan driver 120, a control line driver 130, a sensor 140, a data driver 150, and a controller 160. In FIG. 1, the display panel 110 is illustrated as being separate from driving circuits such as the scan driver 120. However, the disclosure is not limited thereto. For example, at least one of the scan driver 120, the control line driver 130, the sensor 140, and the data driver 150 may be integrated on the display panel 110.

According to an embodiment, the display device 10 may be driven to have a sensing period in which the display device 10 is driven in a sensing mode and a driving period in which the display device 10 is driven in a display mode. The sensing period may be a period of extracting characteristic information of each of pixels P provided in the display panel 110. For example, at least one of the threshold voltage, mobility, and degradation information of a driving transistor and/or an organic light-emitting diode included in each of the pixels P is sensed during the sensing period. The driving period may be a period of displaying a certain image in response to data signals.

The scan driver 120 may be connected to a plurality of scan lines GL and may generate scan signals in response to a first control signal CON1 from the controller 160 and sequentially supply the scan signals to the scan lines GL. The scan driver 120 may include a shift register. For example, the scan driver 120 may sequentially supply the scan signals to the scan lines GL during the sensing period and the driving period. The scan signals may include an activation voltage (turn-on voltage) of the transistor included in the pixel P. The turn-on voltage may have a high-level or low-level voltage.

The control line driver 130 may be connected to a plurality of control lines CL and may supply control signals to the control lines CL during the sensing period in response to a second control signal CON2 from the controller 160. For example, the control line driver 130 may sequentially supply the control signals to the control lines CL during the sensing period. The control signal may include an activation voltage (turn-on voltage) of the transistor included in the pixel P. The turn-on voltage may have a high-level or low-level voltage. The pixels P receiving the control signals may be electrically connected to the sensing lines SL.

In FIG. 1, the control line driver 130 is provided as a separate driver; however, in other embodiments, the scan driver 120 may supply the control signal to the control lines CL in place of the control line driver 130. Alternatively, instead of forming a separate control line CL, the scan line GL may be used to control the connection between the pixels P and the sensing lines SL during the sensing period.

The sensor 140 may be connected to a plurality of sensing lines SL and may sense characteristic information from the pixels P through the sensing lines SL during the sensing period in response to a third control signal CON3 from the controller 160. In an embodiment, the sensing line SL may be provided for each vertical line (column). In other embodiments, a plurality of pixels P of a plurality of columns may share one sensing line SL as described below with reference to FIG. 17.

The sensor 140 may convert the sensed characteristic information having analog form into sensing data having a digital format and output the sensing data having the digital format. For this purpose, the sensor 140 may include at least one analog-to-digital converter (ADC). The sensing data output from the sensor 140 may be stored in a memory (not illustrated) by the controller 160 or the like. The stored sensing data may be used to convert first data DATA1 into second data DATA2 to compensate for a characteristic deviation of the pixels P. For this purpose, the sensing data corresponding to all the pixels P provided in the display panel 110 may be stored in the memory during the sensing period. The sensor 140 may further perform IC calibration, defect filtering, edge filtering, or the like for sensing data correction.

In an embodiment, the sensor 140 may generate sensing data by sensing characteristic information of all the pixels P. In other embodiments, the sensor 140 may not sense characteristic information of some pixels P. In this case, characteristic information of a pixel P on which characteristic information is not sensed by the sensor 140 may be estimated using characteristic information of adjacent pixels P. In an embodiment, a compensator 170 in the controller 160 may estimate characteristic information of a pixel P on which characteristic information is not sensed using characteristic information of adjacent pixels P. In this case, the compensator 170 may perform IC calibration, defect filtering, edge filtering, or the like for sensing data correction.

The data driver 150 may be connected to a plurality of data lines DL and may supply data signals to the data lines DL during the driving period in response to a fourth control signal CON4 from the controller 160. The data driver 150 may generate data signals during the driving period in response to the second data DATA2 supplied from the controller 160. The second data DATA2 may be compensated data which are compensated using the first data DATA1 input from the outside and sensing data of all the pixels P to compensate for a characteristic deviation of the pixels P. The data signals in the form of a voltage or current generated by the data driver 150 may be supplied to the data lines DL. The data signals supplied to the data lines DL may be supplied to the pixels P selected by the scan signals. The pixels P may emit light with a brightness corresponding to the data signals during the driving period, and accordingly, an image may be displayed on the display panel 110.

According to an embodiment, the data driver 150 may supply a reference voltage to the data lines DL during the sensing period in response to the control of the controller 160. For example, the reference voltage may be set to a predetermined voltage at which a current may flow in the driving transistors provided in the pixels P. Moreover, in embodiments, the data driver 150 may not necessarily have to supply the reference voltage to the pixels P during the sensing period. For example, when the pixels P are connected to other voltage sources and/or current sources during the sensing period, the data driver 150 may drive the data lines DL only during the driving period.

The display panel 110 may include a plurality of scan lines GL, a plurality of data lines DL, a plurality of control lines CL, a plurality of sensing lines SL, and a plurality of pixels P connected thereto. The plurality of pixels P may be repeatedly arranged in a first direction (x direction or row direction) and a second direction (y direction or column direction). The plurality of scan lines GL may be spaced at certain intervals and arranged in rows and may each transmit a scan signal. The plurality of control lines CL may be spaced at certain intervals and arranged in rows and may each transmit a control signal. The plurality of data lines DL may be spaced at certain intervals and arranged in columns and may each transmit a data signal. The plurality of sensing lines SL may be spaced at certain intervals and arranged in columns and may each sense characteristic information of the pixel P. According to embodiments, when the display panel 110 is a display panel of an organic electroluminescence (EL) display device, the pixels P of the display panel 110 may be driven by being supplied with a driving voltage ELVDD and a common voltage ELVSS.

The controller 160 may control the driving of the scan driver 120, the control line driver 130, the sensor 140, and the data driver 150. Also, the controller 160 may store the sensing data from the sensor 140 in the memory and may generate the second data DATA2 by converting the first data DATA1 input from the outside by using the stored sensing data. The generated second data DATA2 may be output to the data driver 150. In an embodiment, the first data DATA1, the second data DATA2, and the sensing data may be digital signals. The compensator in the controller 160 may compensate the first data DATA1 by using the sensing data stored in the memory and output compensated first data DATA1 as the second data DATA2.

The controller 160 may include the compensator 170. However, the disclosure is not limited thereto. For example, in other embodiments, a compensator 170 may be a separate component and disposed outside the controller 160, and the compensator 170 may convert the first data DATA1 to generate the second data DATA2.

The compensator 170 may receive the first data DATA1 from outside of the display device, for example, from a graphic controller or an application processor, and the sensing data from the memory and generate the second data DATA2 using the first data DATA1 and the sensing data. The compensator 170 may convert the first data DATA1 into the second data DATA2 by reflecting the sensing data. For example, the compensator 170 may generate the second data DATA2 by compensating the first data DATA1 input from the outside by using the sensing data. The second data DATA2 generated by the compensator 170 may be output to the data driver 150, and the data driver 150 may generate a data signal corresponding to the second data DATA2 and output the generated data signal to the pixels P through the data lines DL.

Hereinafter, an organic light emitting display device will be described as an example of the display device according to an embodiment; however, the display device of the disclosure is not limited thereto. In other embodiments, the display device of the disclosure may be a display device such as an inorganic light-emitting display device (or inorganic EL display device) or a quantum dot light emitting display device.

Figure 2:
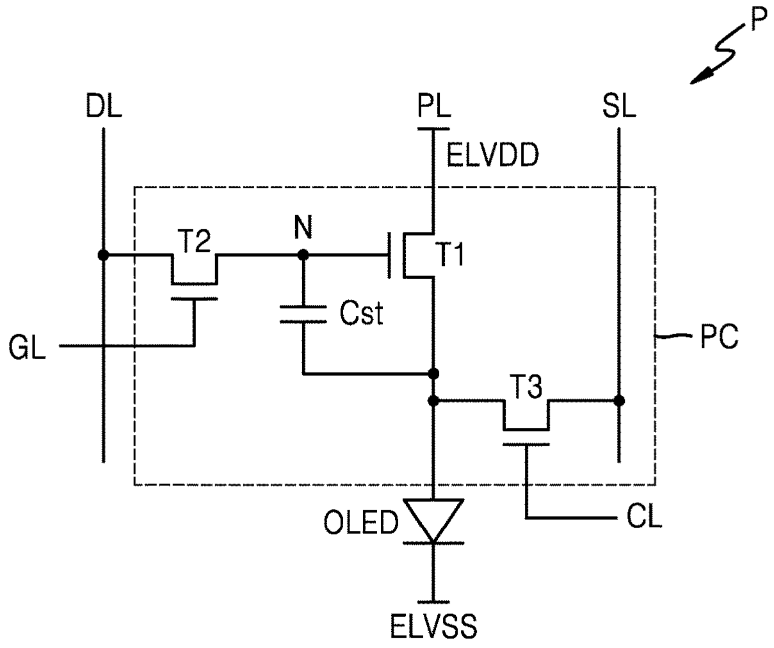
FIG. 2 is an equivalent circuit diagram of a pixel according to an embodiment.
Figure 3:
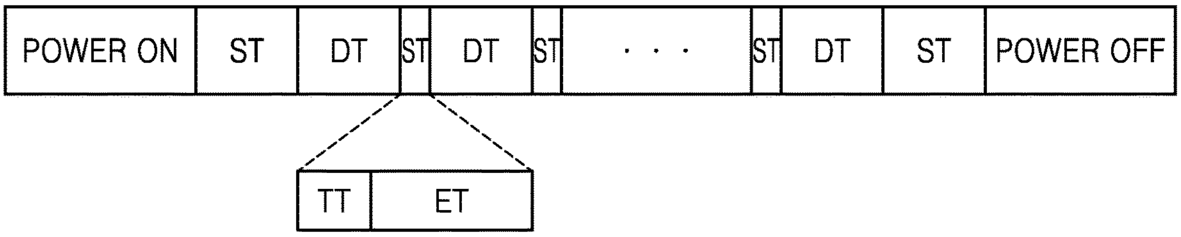
FIG. 3 is a diagram illustrating a sensing period according to an embodiment.

FIG. 2 is an equivalent circuit diagram of a pixel according to an embodiment. FIG. 3 is a diagram illustrating a sensing period according to an embodiment.

Referring to FIG. 2, each of the pixels P may include a pixel circuit PC and an organic light-emitting diode OLED as a display element connected to the pixel circuit PC. The pixel circuit PC may include a first transistor T1 (driving transistor), a second transistor T2 (switching transistor), a third transistor T3 (sensing control transistor), and a capacitor Cst.

The first transistor T1 may include a first electrode connected to a driving voltage line PL for supplying a driving voltage ELVDD and a second electrode connected to a first electrode (pixel electrode) of the organic light-emitting diode OLED. A gate electrode of the first transistor T1 may be connected to a node N. The first transistor T1 may control a driving current flowing from the driving voltage line PL through the organic light-emitting diode OLED in response to a voltage stored in the capacitor Cst. The organic light-emitting diode OLED may emit light with a certain brightness according to the driving current.

The second transistor T2 may include a gate electrode connected to a scan line GL, a first electrode connected to a data line DL, and a second electrode connected to the node N. The second transistor T2 may be turned on according to a scan signal input through the scan line GL to electrically connect the data line DL to the node N and transmit a data signal input through the data line DL to the node N.

The third transistor T3 may include a gate electrode connected to a control line CL, a first electrode connected to the second electrode of the first transistor T1, and the second electrode connected to a sensing line SL. The third transistor T3 may be turned on by a control signal supplied through the control line CL during the sensing period to electrically connect the sensing line SL to the second electrode of the first transistor T1.

The capacitor Cst may be connected between the node N and the second electrode of the first transistor T1. The capacitor Cst may store a voltage corresponding to the difference between the voltage received from the second transistor T2 and the potential of the second electrode of the first transistor T1.

In FIG. 2, N-type transistors are illustrated as the transistors of the pixel circuit; however, embodiments are not limited thereto. For example, according to various embodiments, the transistors of the pixel circuit may be P-type transistors, or some may be P-type transistors and others may be N-type transistors.

According to an embodiment, at least the first transistor T1 may be an oxide semiconductor thin-film transistor including an amorphous or crystalline oxide semiconductor as an active layer. For example, the first to third transistors T1 to T3 may be oxide semiconductor thin-film transistors. The oxide semiconductor thin-film transistors have excellent off-current characteristics. Alternatively, according to an embodiment, at least one of the first to third transistors T1 to T3 may be a low temperature poly-silicon (LTPS) thin-film transistor including polysilicon as an active layer. The LTPS thin-film transistor has high electron mobility, and thus has fast driving characteristics.

The brightness of the pixel P may be mainly determined according to the data signal. However, a characteristic of the first transistor T1 and/or the organic light-emitting diode OLED may additionally affect the brightness of the pixel P. Also, the characteristics of the first transistor T1 and/or the organic light-emitting diode OLED may vary depending on the time of use.

Thus, in embodiments, compensations of the first data DATA1 may be performed to compensate the variations in characteristics of the pixels P by using sensed characteristics of the pixels P during the sensing period by using the third transistor T3 and input data, that is, the first data DATA1, and supplying the compensated first data DATA1 (DATA2) to the data driver 150. Accordingly, an image of uniform quality may be displayed.

More particularly, the pixel P may output characteristic information through the sensing line SL during a sensing period and emit light during a driving period in response to the data signal supplied from the data line DL.

According to embodiments, an operation of sensing the characteristic information of the pixel P may be performed at least once before shipment of the display device. Accordingly, initial characteristic information of the pixel P may be prestored and the same may be used to correct the input data to compensate for a characteristic deviation between the pixels P provided in the display panel 110. Accordingly, the display panel 110 may display an image of uniform quality.

Also, according to embodiments, an operation of sensing the characteristic information of the pixels P may be performed every sensing period during actual use of the display device. Accordingly, even when a characteristic deviation between the pixels P occurs depending on the time of use, the changed characteristic information of the pixels P may be updated in real time and reflected in generation of data signals. Thus, an image of uniform quality may be displayed on the display panel 110. As shown in FIG. 3, a sensing period ST may be disposed after power is applied (power on), between driving periods DT, and before power is turned off (power off).

The sensing period ST may include a transition period TT and an effective period ET. When the display device enters a sensing mode, input power (e.g., the driving voltage ELVDD, the common voltage ELVSS, or the reference voltage) applied to the display panel 110 may be unstable at the beginning of the sensing period ST, and thus, a noise may be included in a sensing result. Hereinafter, a period from the start of the sensing period ST (t1 in FIG. 8) to a time when the input power is stabilized (t2 in FIG. 8) is referred to as a transition period TT, and a period from the time when the input power is stabilized to a time when sensing is terminated is referred to an effective period ET. The length of the transition period TT may be preset as time for the input power enough to be stabilized by a test.

The sensor 140 may obtain sensing data from a partial area of the display panel 110 during the transition period TT. The sensing data obtained by the sensor 140 (see FIG. 1) during the transition period TT may not be used by the compensator 170. In an embodiment, the sensor 140 may process the sensing data obtained during the transition period TT as dummy data and not provide the sensing data to the compensator 170. In another embodiment, the sensor 140 may provide the sensing data obtained during the transition period TT to the compensator 170, and the compensator 170 may process the sensing data as dummy data and not use the sensing data to generate the second data DATA2. By not using characteristic information obtained during the transition period TT, the accuracy of the sensing result may be improved.

Figure 4:
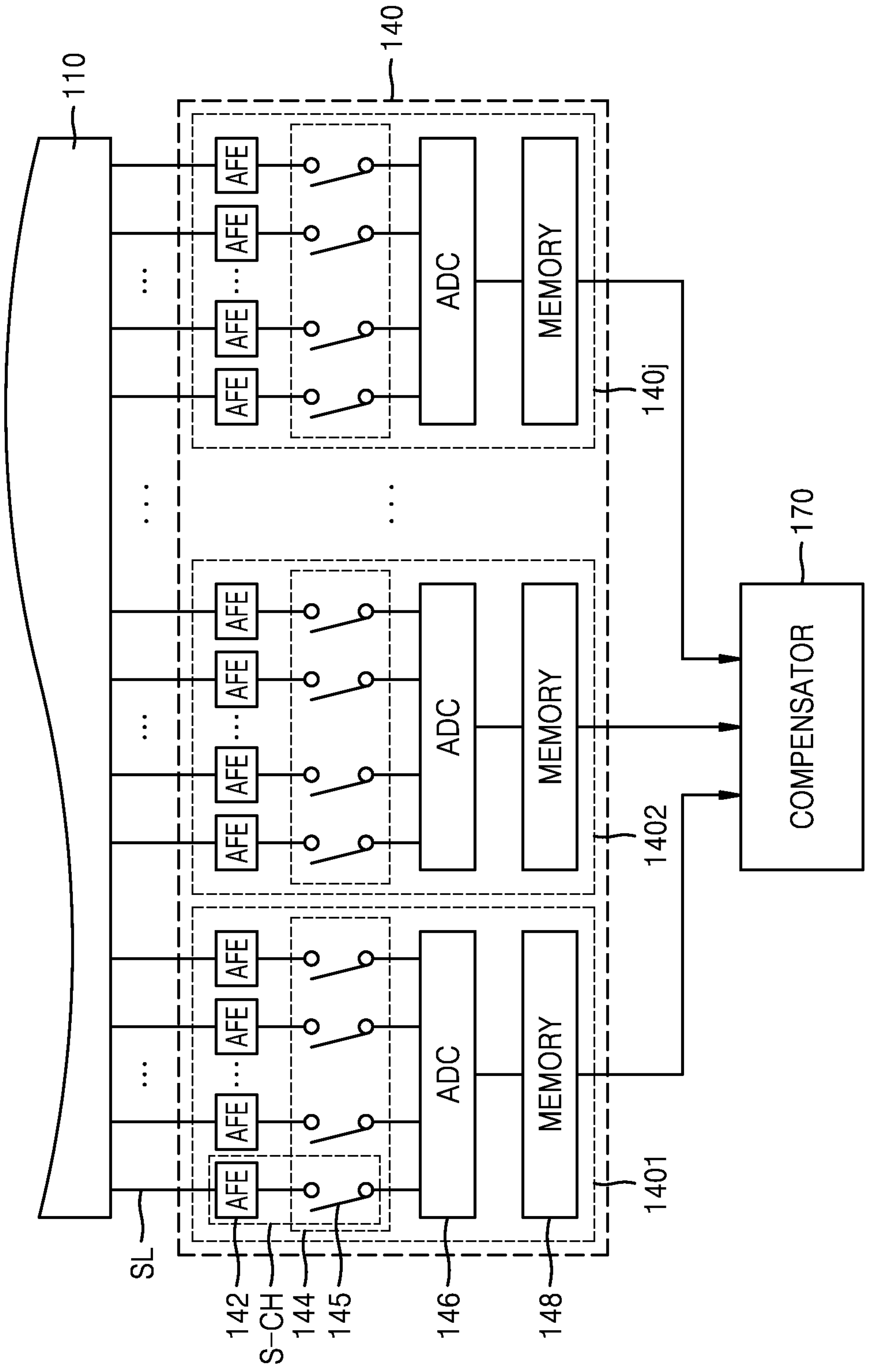
FIG. 4 is a diagram illustrating a display device according to an embodiment, and in particular, a diagram illustrating an embodiment of a sensor.
Figure 5:
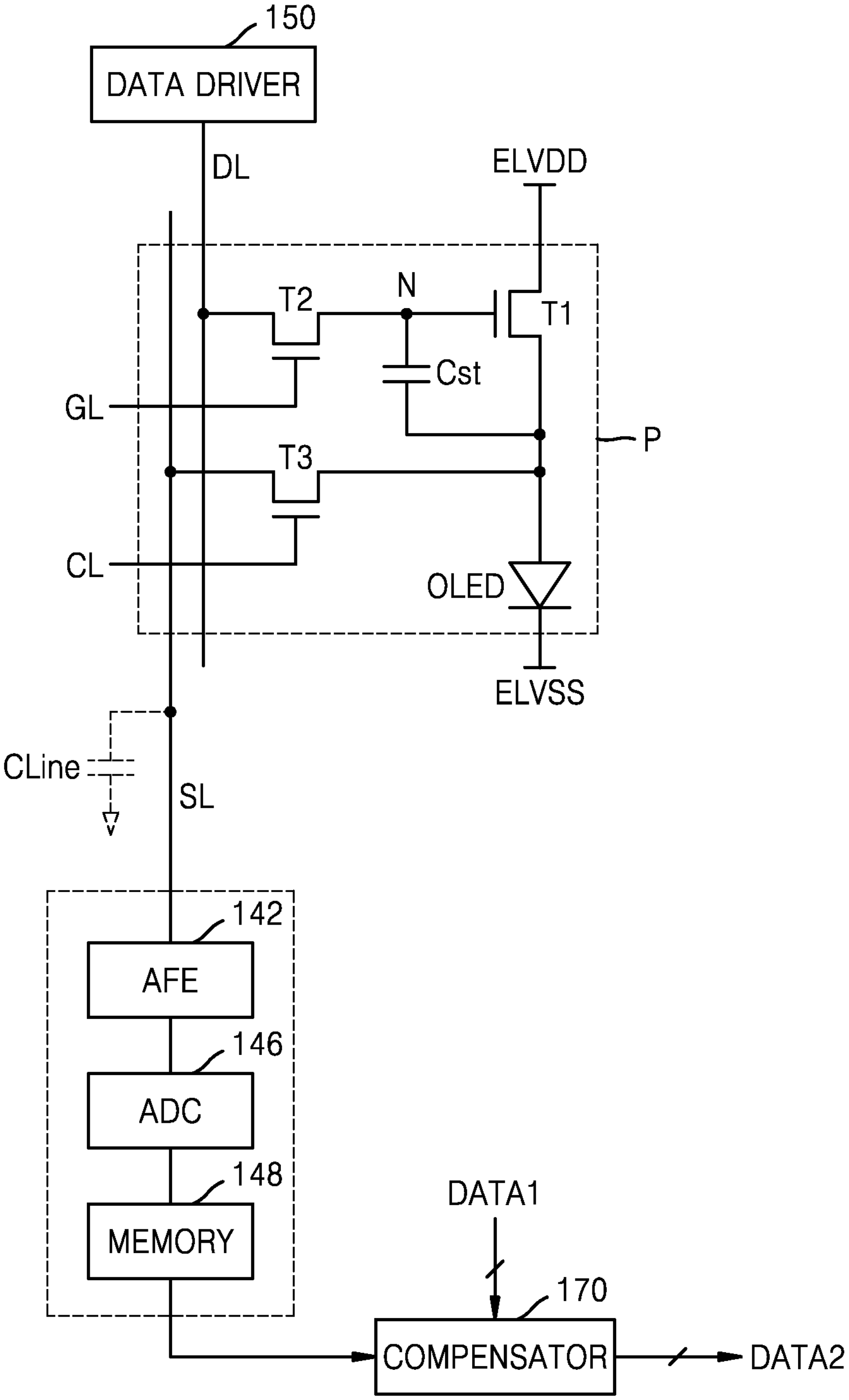
FIG. 5 is a diagram illustrating a channel provided in a sensor according to an embodiment.

FIG. 4 is a diagram illustrating a display device according to an embodiment, and in particular, a diagram illustrating an embodiment of a sensor. FIG. 5 is a diagram illustrating a channel provided in a sensor according to an embodiment. In FIG. 5, only one sensing channel among a plurality of sensing channels shown in FIG. 4 is illustrated.

Referring to FIG. 4, a sensor 140 according to an embodiment may include first to j-th sensing integrated circuits (ICs) 1401 to 140*j* (where j is a natural number of 2 or more). The first to j-th sensing ICs 1401 to 140*j* may be implemented as a readout IC that extracts characteristic information of pixels. The sensor 140 may be enabled during a sensing period and disabled during a driving period.

Each of the first to j-th sensing ICs 1401 to 140*j* may include a plurality of analog front ends (AFEs) 142 respectively connected to a plurality of sensing lines SL, an ADC 146 connected to the output terminals of the plurality of AFEs 142, and a switching portion 144 including a plurality of switches 145 connected between the AFEs 142 and the ADC 146. An AFE 142 and a switch 145 which are connected to each of the sensing lines SL may constitute one sensing channel S—CH. That is, each of the first to j-th sensing ICs 1401 to 140*j* may include a plurality of sensing channels S—CH.

The AFE 142 may sample and hold characteristic information of a pixel which is input from the sensing line SL and temporarily store the sampled and held characteristic information. To this end, the AFE 142 may include a capacitor connected to the sensing line SL.

The switching portion 144 may sequentially connect the plurality of AFEs 142 to one ADC 146 and accordingly, it may be controlled such that characteristic information stored in the AFEs 142 may be sequentially supplied to the ADC 146 and converted into sensing data.

The ADC 146 may convert analog characteristic information which is sequentially provided from a plurality of AFEs 142 in sensing channels S—CH allocated by the switching portion 144 into digital sensing data.

The sensor 140 may further include a memory 148 connected to the ADC 146. The memory 148 may function as a buffer for temporarily storing digital sensing data supplied from the ADC 146. Digital sensing data corresponding to characteristic information of each pixel may be stored in the memory 148. The digital sensing data stored in the memory 148 may be supplied to the compensator 170 of the controller 160.

The compensator 170 may convert first data DATA1 into second data DATA2 so that characteristic deviation between pixels is compensated based on sensing data including characteristic information of each of the pixels.

Hereinafter, operations of the pixel and the sensor 140 which include the sensing period and the driving period will be described in more detail with reference to FIG. 5.

According to an embodiment, during the sensing period, the sensor 140 may extract characteristic information of pixels P through the sensing lines SL and convert the extracted characteristic information into sensing data. The compensator 170 may set a compensation value to compensate for the characteristic deviation between the pixels P in response to the sensing data.

During the sensing period, the data driver 150 may supply a reference voltage to a data line DL to an extent that current may flow through the pixels P. According to an embodiment, the data driver 150 may not supply the reference voltage. In this case, the pixels P may be driven by electrically connecting data lines DL to a certain current source and/or voltage source during the sensing period.

Also, a scan signal and a control signal may be respectively supplied to a scan line GL and a control line CL during a predetermined period of the sensing period. According to an embodiment, the scan signal and the control signal may be sequentially supplied for each horizontal line (row) of a display panel 110. A second transistor T2 and a third transistor T3 in pixels P in a row which receives the scan signal and the control signal may be turned on. When the third transistor T3 is turned on, a second electrode of a first transistor T1 may be electrically connected to a sensing line SL. In addition, when the second transistor T2 is turned on, the reference voltage from the data line DL may be transferred to a node N.

When the reference voltage is supplied to the node N, the first transistor T1 is turned on. Accordingly, a current corresponding to the reference voltage is generated in the pixels P, and the current may be supplied to the sensing line SL via the third transistor T3 of each of the pixels P.

The sensing line SL has a certain resistance value, and, accordingly, a voltage corresponding to a certain current flowing through a corresponding pixel P is applied to each of the sensing lines SL. The voltage applied to the sensing line SL may be stored in a line capacitor CLine parasitically formed in the sensing line SL, and may also be stored in the AFE 142 connected to the sensing line SL.

The voltage stored in the line capacitor CLine and the AFE 142 may include characteristic information of the first transistor T1 included in a pixel P of the currently sensed row. A current flowing through the first transistor T1 in response to the reference voltage may reflect a threshold voltage, mobility, and deterioration of the first transistor T1.

According to an embodiment, characteristic information of an organic light-emitting diode OLED may be additionally extracted. For example, by connecting the organic light-emitting diode OLED provided in the pixel P of a row to be sensed to a certain current source, current may flow through the organic light-emitting diode OLED. Furthermore, by extracting a voltage applied to one electrode (e.g., a pixel electrode) of the organic light-emitting diode OLED, characteristic information corresponding to the threshold voltage and deterioration of the organic light-emitting diode OLED may be additionally extracted.

A method of extracting characteristic information of the pixel P is not limited to the above-described embodiment. For example, characteristic information of the pixel P may be extracted by various known methods.

When a voltage applied to the sensing lines SL is input to the sensor 140 through the AFEs 142, the ADC 146 may convert an analog voltage stored in the AFEs 142 into sensing data having a digital format. The sensing data output from the ADC 146 may be temporarily stored in the memory 148 in the sensing integrated circuit 1401, . . . , 140*j* and then input to the compensator 170. The compensator 170 receiving sensing data corresponding to each of the pixels P may set a compensation value corresponding to the sensing data for each pixel P. The compensator 170 may convert the first data DATA1 into the second data DATA2 during the driving period by reflecting the compensation value set in the sensing period and output the second data DATA2 to the data driver 150.

The second data DATA2 output from the compensator 170 during the driving period may be input to the data driver 150, and the data driver 150 may generate a data signal corresponding to the second data DATA2 and output the generated data signal to the data lines DL.

During the driving period, a scan signal may be supplied to the scan lines GL. According to an embodiment, the scan signal may be sequentially supplied the scan lines in the display panel 110 one row at a time. The second transistor T2 may be turned on in each of the pixels P receiving the scan signal. Accordingly, a data signal applied to the data line DL may be transmitted to the node N of the pixel P, and a voltage corresponding to the data signal may be charged in the capacitor Cst.

When the data signal is supplied to the node N, the first transistor T1 is turned on, and the turned-on first transistor T1 may supply a driving current corresponding to the data signal to the organic light-emitting diode OLED. Accordingly, the driving current flows from the driving voltage line PL (see FIG. 2) along a current path through the first transistor T1 and the organic light-emitting diode OLED. Then, the organic light-emitting diode OLED may emit light with a brightness corresponding to the driving current. Because the data signal is generated in response to the second data DATA2, a characteristic deviation between the pixels P may be compensated for and thus an image of uniform quality may be displayed on the display panel.

Figure 6:
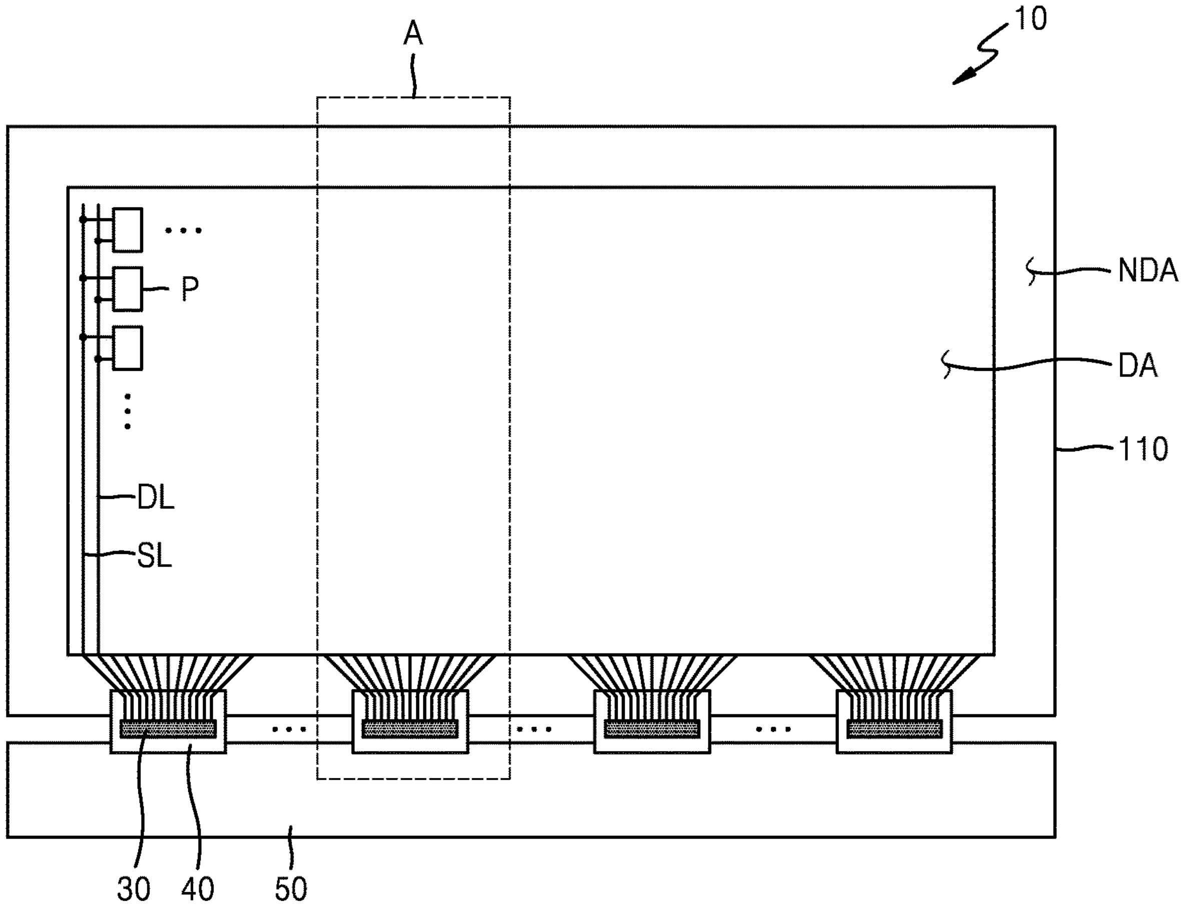
FIG. 6 is a diagram illustrating a display device according to an embodiment.

FIG. 6 is a diagram illustrating a display device according to an embodiment.

Referring to FIG. 6, a display device 10 may include a display panel 110 and a plurality of driving circuits 30. The plurality of driving circuits 30 may correspond to certain areas of the display panel 110, and each driving circuit 30 may be connected to a plurality of data lines and a plurality of sensing lines arranged in the corresponding area.

The display panel 110 may include a display area DA in which a plurality of pixels P are arranged and a peripheral area NDA outside the display area DA. The peripheral area NDA may be a non-display area in which pixels P are not arranged. The display area DA may be entirely surrounded by the peripheral area NDA. In an embodiment, dummy pixels may be arranged in the peripheral area NDA. Each of the dummy pixels may be a pixel that is not involved in the display of an image. Each of the dummy pixels may not have a display element.

Each of the plurality of driving circuits 30 may be mounted on a connection circuit board 40 of a film type, and the driving circuits 30 may be connected to each other by a circuit board 50. Each of connection circuit boards 40 may be connected to pads provided in the peripheral area NDA of the display panel 110. Each of the driving circuits 30 may be an integrated circuit (IC), and may include a data driver (e.g., the data driver 150 in FIG. 1) connected to a plurality of data lines arranged in a corresponding area of the display panel 110, and a sensor (e.g., the sensor 140 in FIG. 1) connected to a plurality of sensing lines. A scan driver (e.g., the scan driver 120 in FIG. 1) connected to a plurality of scan lines may be provided directly in the peripheral area NDA of the display panel 110.

Each of the pixels P may be a pixel emitting light of a certain color. The pixels P may include a first pixel emitting a first color of light, a second pixel emitting a second color of light, and a third pixel emitting a third color of light. For example, the first pixel may be a red pixel emitting red light, the second pixel may be a green pixel emitting green light, and the third pixel may be a blue pixel emitting blue light. Each of the first to third pixels may include a display element. The display element may be connected to a pixel circuit. The display element may include an organic light-emitting diode or a quantum dot organic light-emitting diode.

Figure 7:
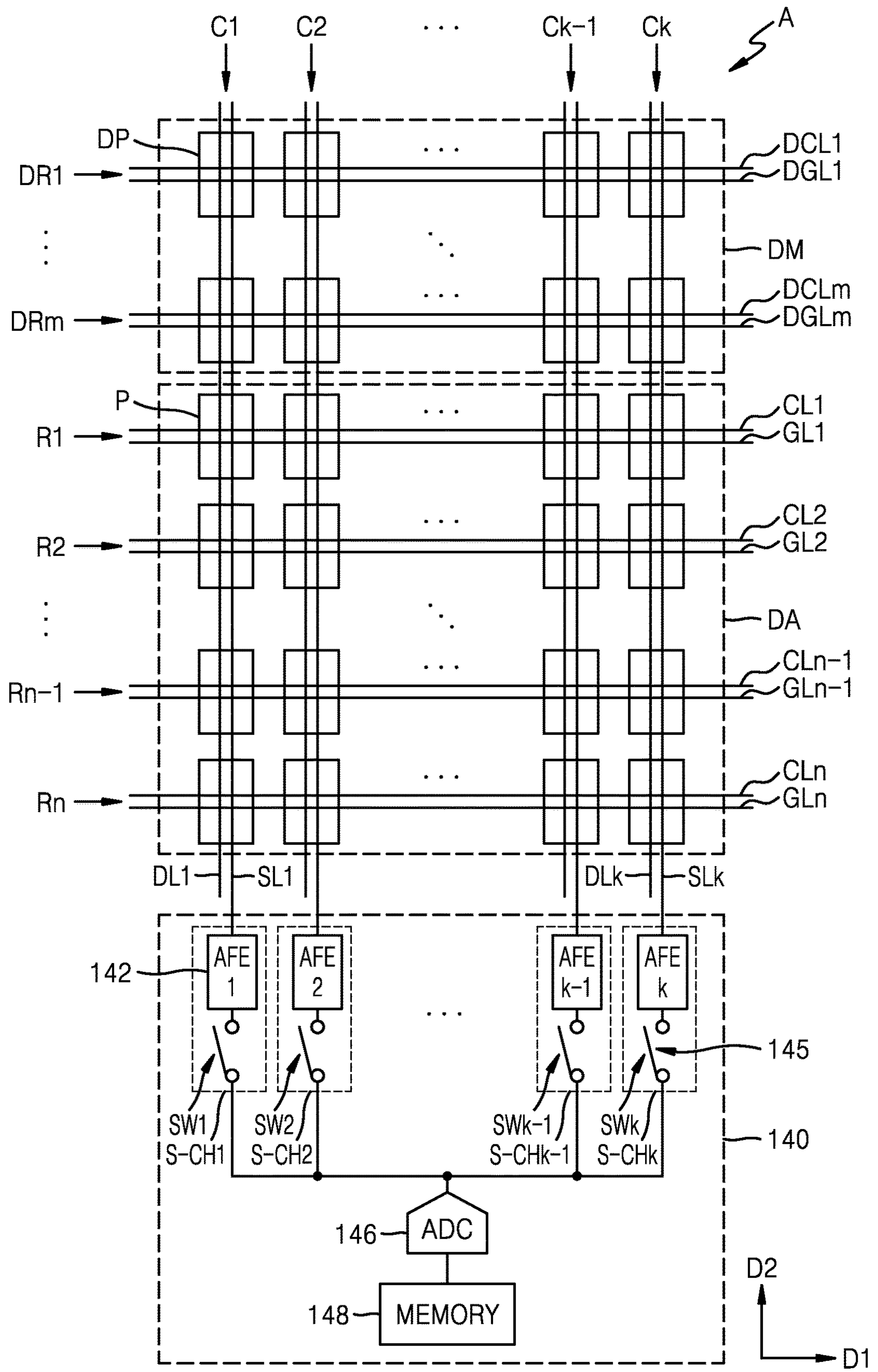
FIG. 7 is a schematic diagram illustrating a portion of the display device of FIG. 6, according to an embodiment.
Figure 8:
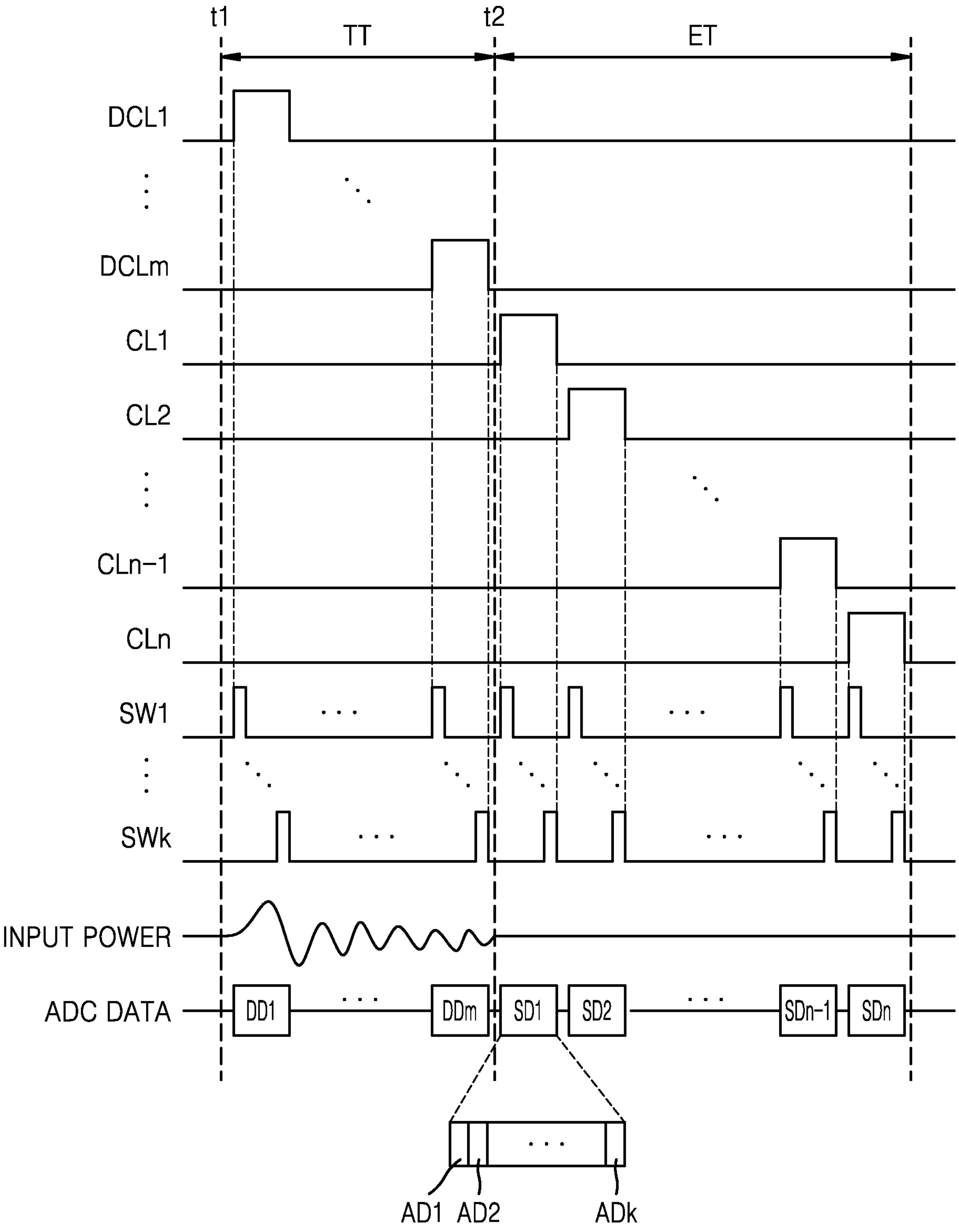
FIG. 8 is a diagram illustrating signals applied during a sensing period in the display device of FIG. 7.

FIG. 7 is a schematic diagram illustrating a portion A of the display device of FIG. 6, according to an embodiment. FIG. 8 is a diagram illustrating signals applied during a sensing period in the display device of FIG. 7.

Referring to FIG. 7, the display panel 110 of FIG. 6 may include a display area DA and a peripheral area NDA, and a dummy area DM may be included in the peripheral area NDA.

A plurality of pixels P may be provided in a plurality of rows R1 to Rn and a plurality of columns C1 to Ck of the display area DA. Each of the pixels P may be connected to a corresponding one of a plurality of scan lines GL1 to GLn and a corresponding one of a plurality of data lines DL1 to DLk. Furthermore, each of the pixels P may be connected to a corresponding one of a plurality of control lines CL1 to CLn and a corresponding one of a plurality of sensing lines SL1 to SLk. The scan lines GL1 to GLn and the control lines CL1 to CLn may extend in a first direction D1, and the data lines DL1 to DLk and the sensing lines SL1 to SLk may extend in a second direction D2.

The dummy area DM may be disposed, for example, at an upper end of a first row R1 to which a first scan signal of the display area DA is applied. The dummy area DM may include at least two dummy rows DR1 to DRm in which a plurality of dummy pixels DP are provided. Each of the dummy pixels DP may be connected to a corresponding one of a plurality of dummy scan lines DGL1 to DGLm and a corresponding one of the plurality of data lines DL1 to DLk. Also, each of the dummy pixels DP may be connected to a corresponding one of a plurality of dummy control lines DCL1 to DCLm and a corresponding one of the plurality of sensing lines SL1 to SLk. The dummy scan lines DGL1 to DGLm and the dummy control lines DCL1 to DCLm may extend in the first direction D1. The number of dummy rows may be determined according to the length of a transition period TT (see FIG. 8). For example, when the length of the transition period TT is set to j times the scanning time of the scan signal, the number of dummy rows in the dummy area DM may be j ($j \leq m$).

One end of each of the sensing lines SL1 to SLk may be connected to a corresponding AFE 142 of the sensor 140. As switches SW1 to SWk are sequentially turned on, an ADC 146 may sequentially receive characteristic information having analog form from sensing channels S-CH1 to S-CHk and may convert the characteristic information having analog form into sensing data having a digital format and store the converted sensing data in a memory 148.

Referring to FIG. 8, a scan signal may be sequentially applied to the dummy scan lines DGL1 to DGLm and the scan lines GL1 to GLn, and a reference voltage may be applied to the data lines DL1 to DLk and thus may be applied to the dummy pixels DP and the pixels P. Furthermore, a control signal may be sequentially applied to the dummy control lines DCL1 to DCLm and the control lines CL1 to CLn. The control signal may overlap the scan signal.

The sensor 140 may process sensing data obtained by sensing the dummy area DM as dummy data and not transmit the sensing data processed as dummy data to the compensator 170. However, the sensor 140 may transmit sensing data obtained by sensing the display area DA to the compensator 170. A period for sensing the dummy area DM may correspond to the transition period TT and a period for sensing the display area DA may correspond to an effective period ET (see FIG. 8). For example, while a scan signal from the scan driver 120 and a control signal from the control line driver 130 are sequentially applied to the dummy rows DR1 to DRm of the dummy area DM, that is, during the transition period TT, the sensor 140 may sequentially sense the dummy pixels DP arranged in the dummy area DM through the sensing lines SL1 to SLk one row at a time. While a scan signal from the scan driver 120 and a control signal from the control line driver 130 are sequentially applied to the rows R1 to Rn of the display area DA, that is, during the effective period ET, the sensor 140 may sequentially sense the pixels P arranged in the display area DA through the sensing lines SL1 to SLk one row at a time.

For example, when a control signal is applied to the dummy control line DCL1 of the first dummy row DR1, dummy pixels DP provided in the first dummy row DR1 may be connected to the sensing lines SL1 to SLk. Furthermore, characteristic information of the dummy pixels DP applied from the sensing lines SL1 to SLk to AFEs AFE1 to AFEk may be output to the ADC 146 by the switch 145, and the ADC 146 may generate dummy data DD1. In addition, when sensing is performed up to the m-th dummy row DRm, and then a control signal is applied to the control line CL1 of the first row R1, pixels DP provided in the first row R1 may be connected to the sensing lines SL1 to SLk. Furthermore, characteristic information of the pixels P applied from the sensing lines SL1 to SLk to the AFEs AFE1 to AFEk may be output to the ADC 146 by the switch 145, and the ADC 146 may generate sensing data SD1 of the first row R1. The sensing data SD1 may include sensing data AD1 to ADk sequentially generated by the ADC 146 for each of pixels P connected to first to k-th sensing lines SL1 to SLk of the first row R1. Sensing may be performed up to an n-th row.

The sensor 140 may not output dummy data DD1 to DDm generated by sequentially sensing dummy pixels DP of first to m-th dummy rows DR1 to DRm to the compensator 170. The sensor 140 may store sensing data SD1 to SDn generated by sensing pixels P of first to n-th rows R1 to Rn in the memory 148 and then output the sensing data SD1 to SDn to the compensator 170.

In another embodiment, the dummy data DD1 to DDm may be output to the compensator 170 but may not be used by the compensator 170.

Figure 9:
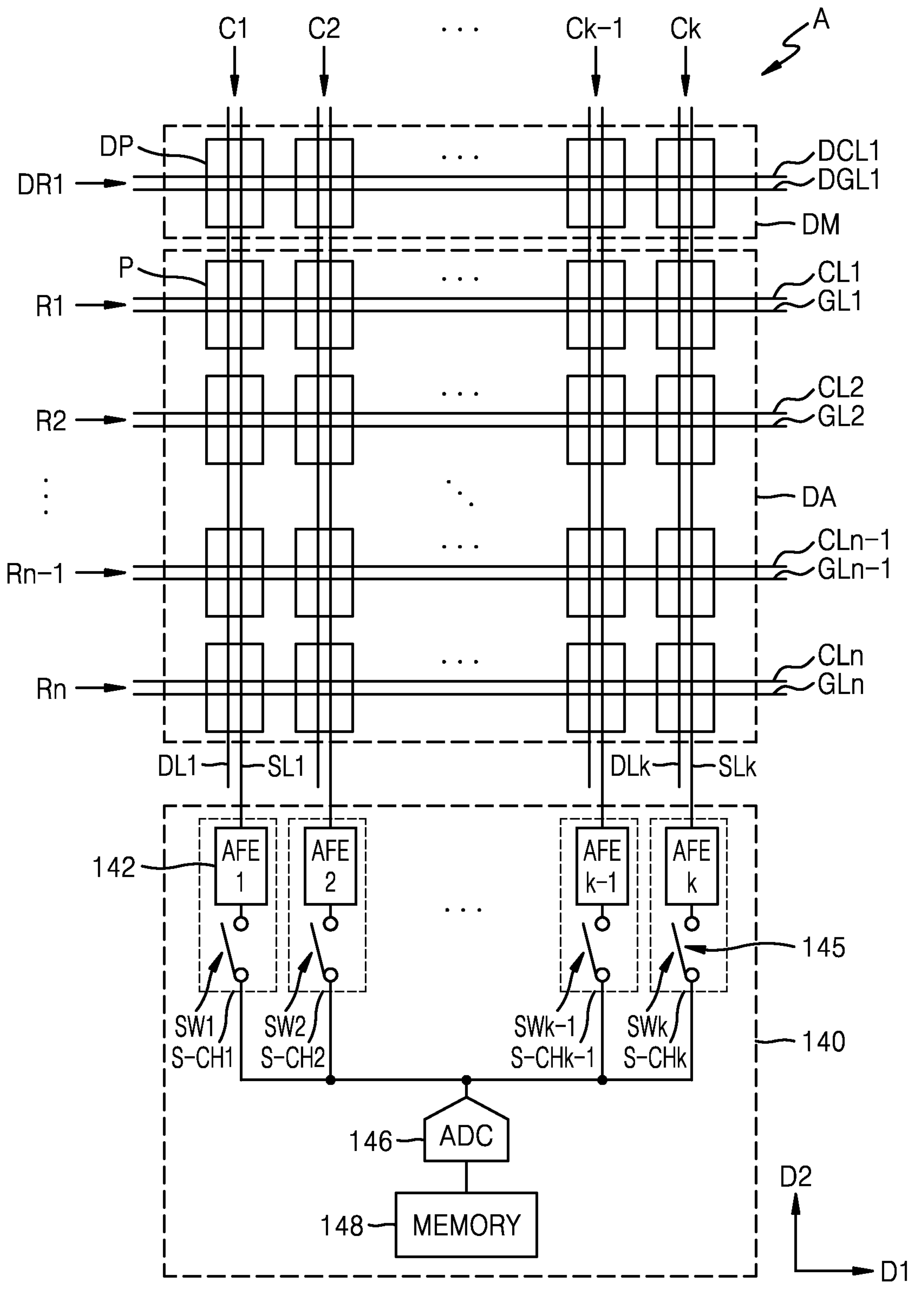
FIG. 9 is a schematic diagram illustrating a portion of the display device of FIG. 6, according to an embodiment.
Figure 10:
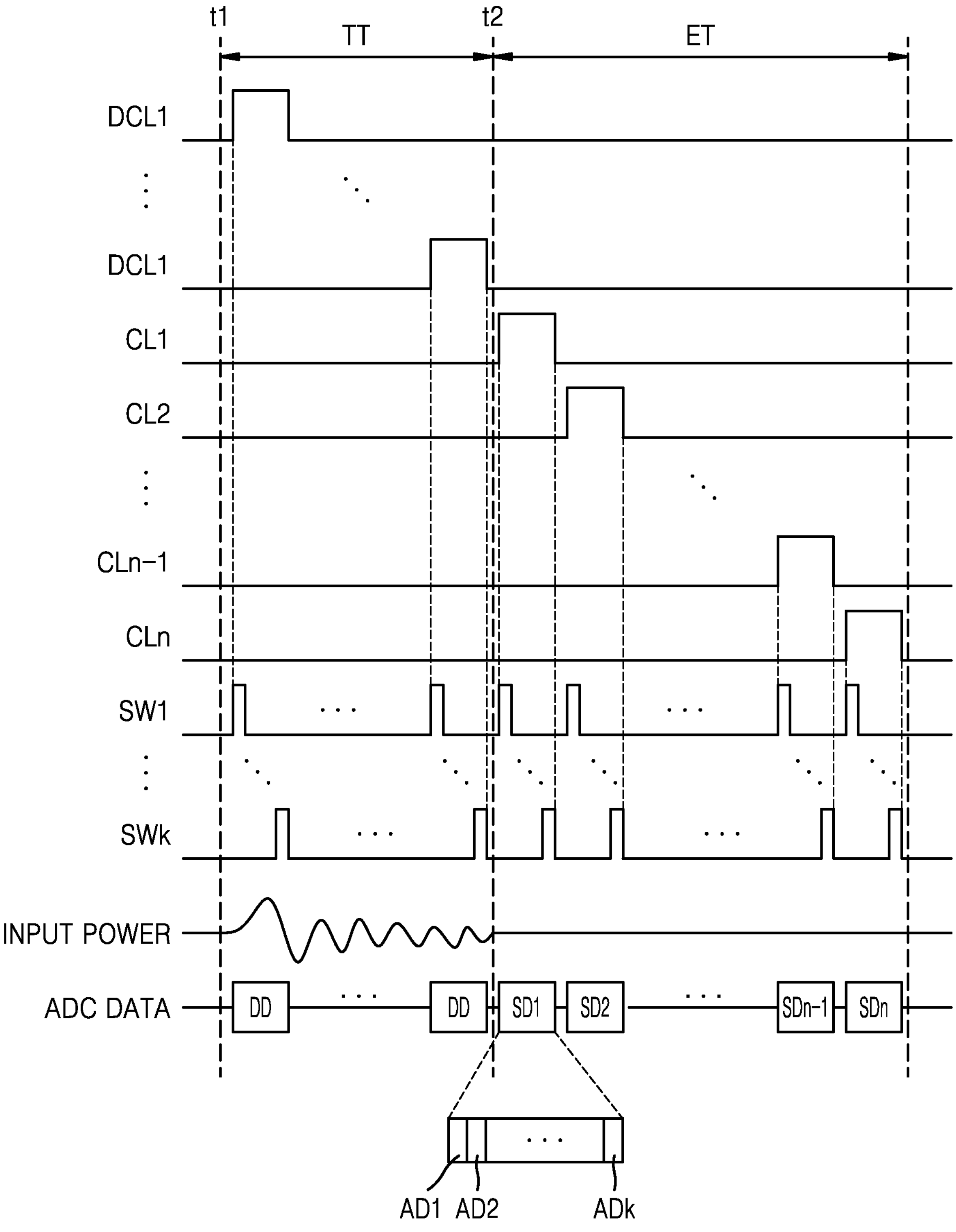
FIG. 10 is a diagram illustrating signals applied during a sensing period in the display device of FIG. 9.

FIG. 9 is a schematic diagram illustrating a portion A of the display device of FIG. 6, according to an embodiment. FIG. 10 is a diagram illustrating signals applied during a sensing period in the display device of FIG. 9.

The embodiment shown in FIG. 9 is different from the embodiment shown in FIG. 7 in that only one dummy row DR1 is included in the dummy area DM. Hereinafter, detailed descriptions of configurations that are the same as those of FIG. 7 will be omitted.

Referring to FIGS. 9 and 10, a scan signal may be repeatedly applied a certain number of times to a dummy scan line DGL1 of a dummy row DR1 of a dummy area DM during a transition period TT and then sequentially applied to scan lines GL1 to GLn of a display area DA during an effective period ET.

When the dummy row DR1 is selected by the scan signal, a reference voltage may be applied to data lines DL1 to DLk, and thus, the reference voltage may be applied to dummy pixels DP. In addition, a control signal may be repeatedly applied a certain number of times to a dummy control line DCL1. The control signal may overlap with the scan signal. In an embodiment, the scan signal and the control signal may be repeatedly applied a certain number of times to the dummy row DR1 during the transition period TT. The number of times the scan signal is applied to the dummy scan line DGL1 and the number of times the control signal is applied to the dummy control line DCL1 may be determined according to the length of the transition period TT. For example, when the length of the transition period TT is set to j times the scanning time of the scan signal, the scan signal and the control signal may be repeatedly applied j times to the dummy row DR1 of the dummy area DM.

In another embodiment, the control signal may be repeatedly applied a certain number of times to the dummy row DR1 while the scan signal is applied once to the dummy row DR1 during the transition period TT. In this case, the length of the scan signal applied to the dummy row DR1 may correspond to the length of the transition period TT and may be greater than the length of the scan signal applied to the display area DA.

When first to n-th rows R1 to Rn of the display area DA are sequentially selected by the scan signal during the effective period ET, a reference voltage may be applied to the data lines DL1 to DLk, and thus, the reference voltage may be applied to pixels P. Furthermore, a control signal may be sequentially applied to control lines CL1 to CLn. The control signal may overlap with the scan signal.

A sensor 140 may not output, to the compensator 170, dummy data DD generated by sensing the dummy pixels DP of the dummy row DR1 of the dummy area DM multiple times. The sensor 140 may store, in a memory 148, sensing data SD1 to SDn generated by sensing pixels P in first to n-th rows R1 to Rn of the display area DA and then output the sensing data SD1 to SDn to the compensator 170.

Figure 11:
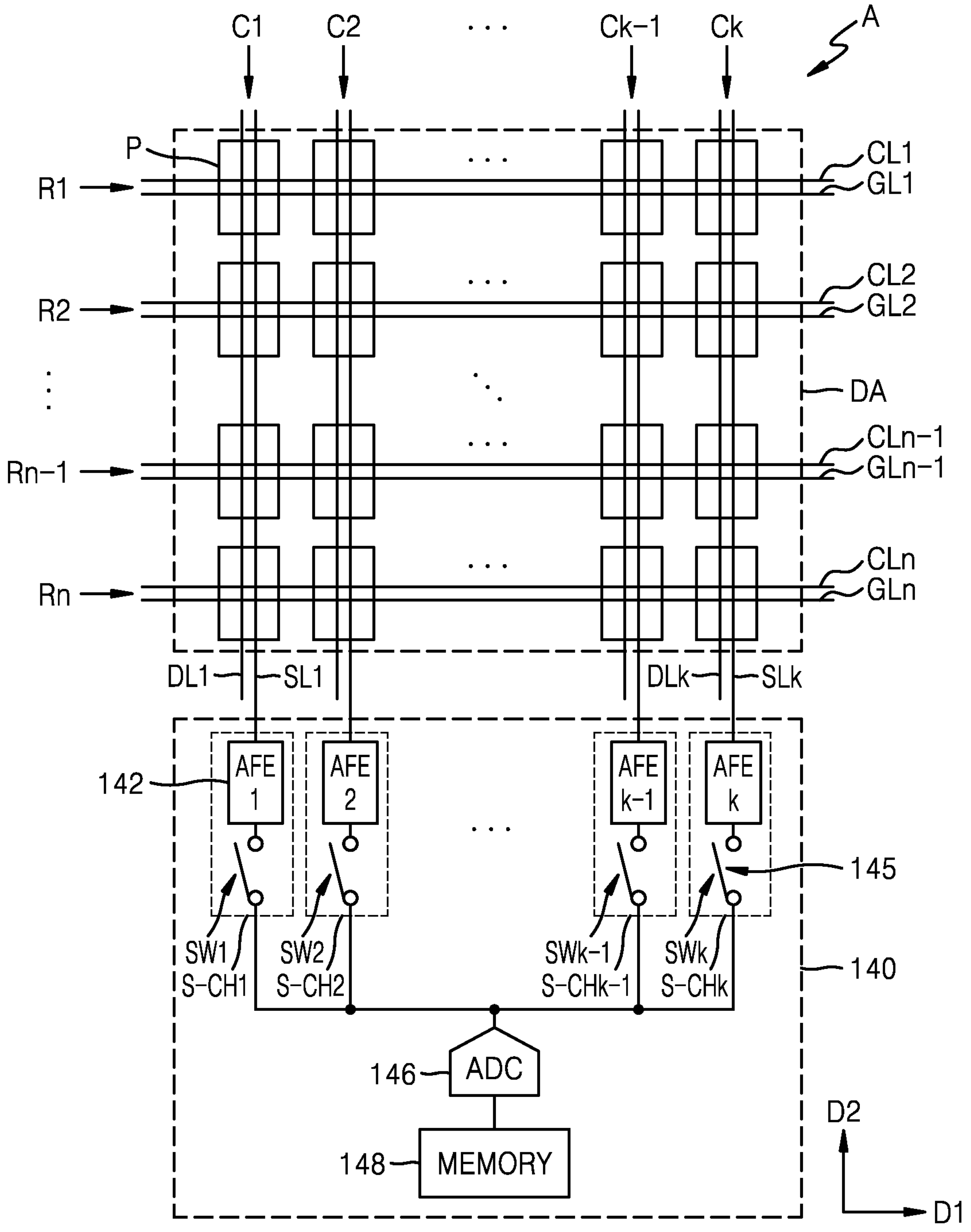
FIG. 11 is a schematic diagram illustrating a portion of the display device of FIG. 6, according to an embodiment.
Figure 12:
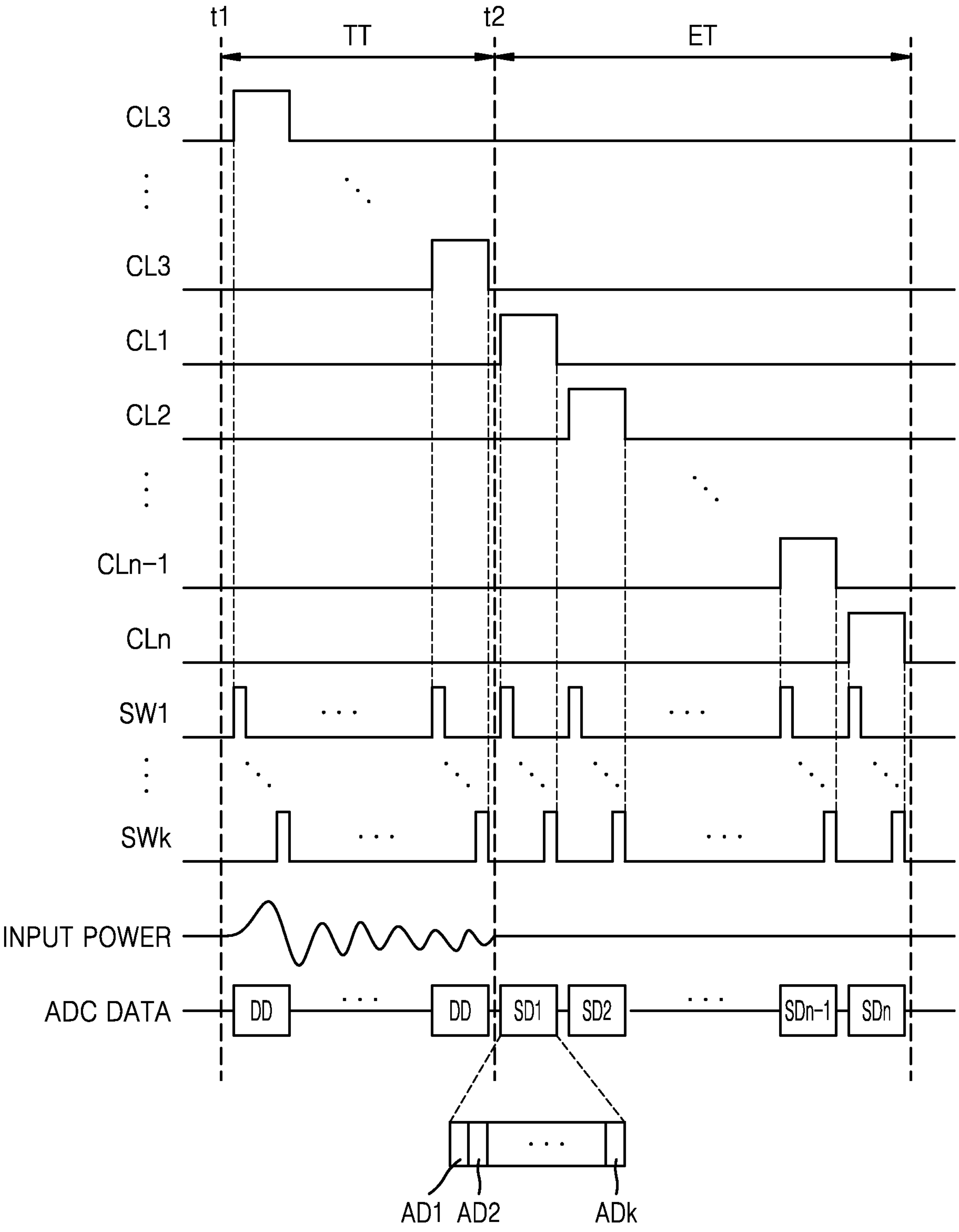
FIG. 12 is a diagram illustrating signals applied during a sensing period in the display device of FIG. 11.

FIG. 11 is a schematic diagram illustrating a portion A of the display device of FIG. 6, according to an embodiment. FIG. 12 is a diagram illustrating signals applied during a sensing period in the display device of FIG. 11.

The embodiment shown in FIG. 11 is different from the embodiment shown in FIG. 7 in that there is no dummy area DM in the display panel 110 (see FIG. 6).

Referring to FIGS. 11 and 12, a scan signal may be repeatedly applied a certain number of times to a scan line in a row of a display area DA during a transition period TT and then sequentially applied to scan lines GL1 to GLn of all rows of the display area DA during an effective period ET. When a row is selected by the scan signal during the transition period TT, a reference voltage may be applied to data lines DL1 to DLk, and thus, the reference voltage may be applied to pixels P of the selected row. In addition, a control signal may be repeatedly applied a certain number of times to a control line of the selected row during the transition period TT. The control signal may overlap with the scan signal. FIG. 12 shows an example in which a third row is selected during the transition period TT and the control signal is repeatedly applied a certain number of times to a control line CL3 of the third row.

The number of times the scan signal is applied and the number of times the control signal is applied to the selected row during the transition period TT may be determined according to the length of the transition period TT. For example, when the length of the transition period TT is set to j times the scanning time of the scan signal, the scan signal and the control signal may be repeatedly applied j times to a scan line and a control line of the selected row.

Subsequently, when first to n-th rows R1 to Rn of the display area DA are sequentially selected by the scan signal during the effective period ET, a reference voltage may be applied to the data lines DL1 to DLk, and thus, the reference voltage may be applied to pixels P. Furthermore, a control signal may be sequentially applied to control lines CL1 to CLn. The control signal may overlap with the scan signal.

A sensor 140 may process sensing data generated by sensing multiple times pixels P of a row selected in the display area DA during the transition period TT as dummy data DD and not output the sensing data to the compensator 170. The sensor 140 may store sensing data SD1 to SDn generated by sensing pixels P of the first to n-th rows R1 to Rn sequentially selected in the display area DA during the effective period ET in a memory 148 and then output the sensing data SD1 to SDn to the compensator 170.

Figure 13:
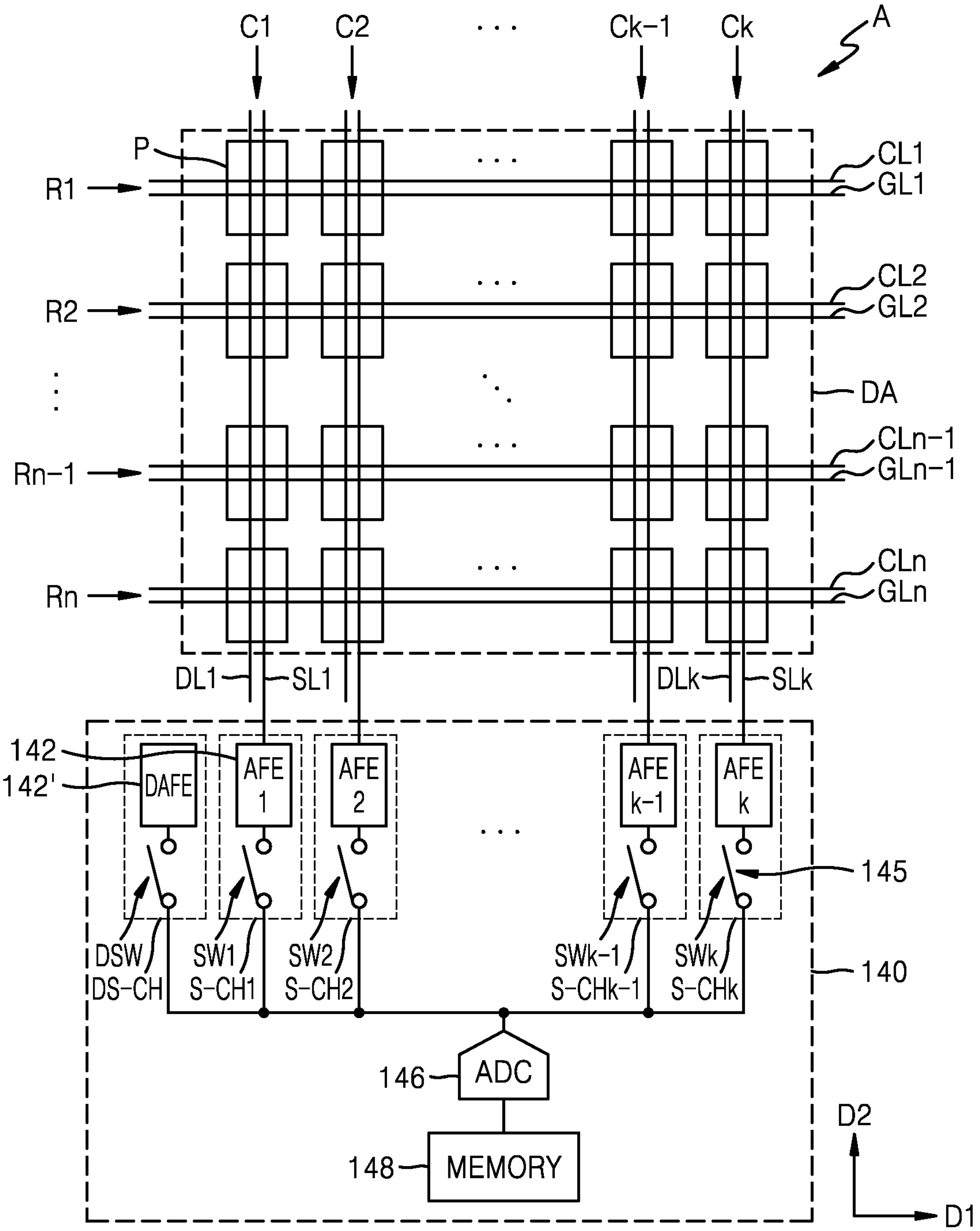
FIG. 13 is a schematic diagram illustrating a portion of the display device of FIG. 6, according to an embodiment.
Figure 14:
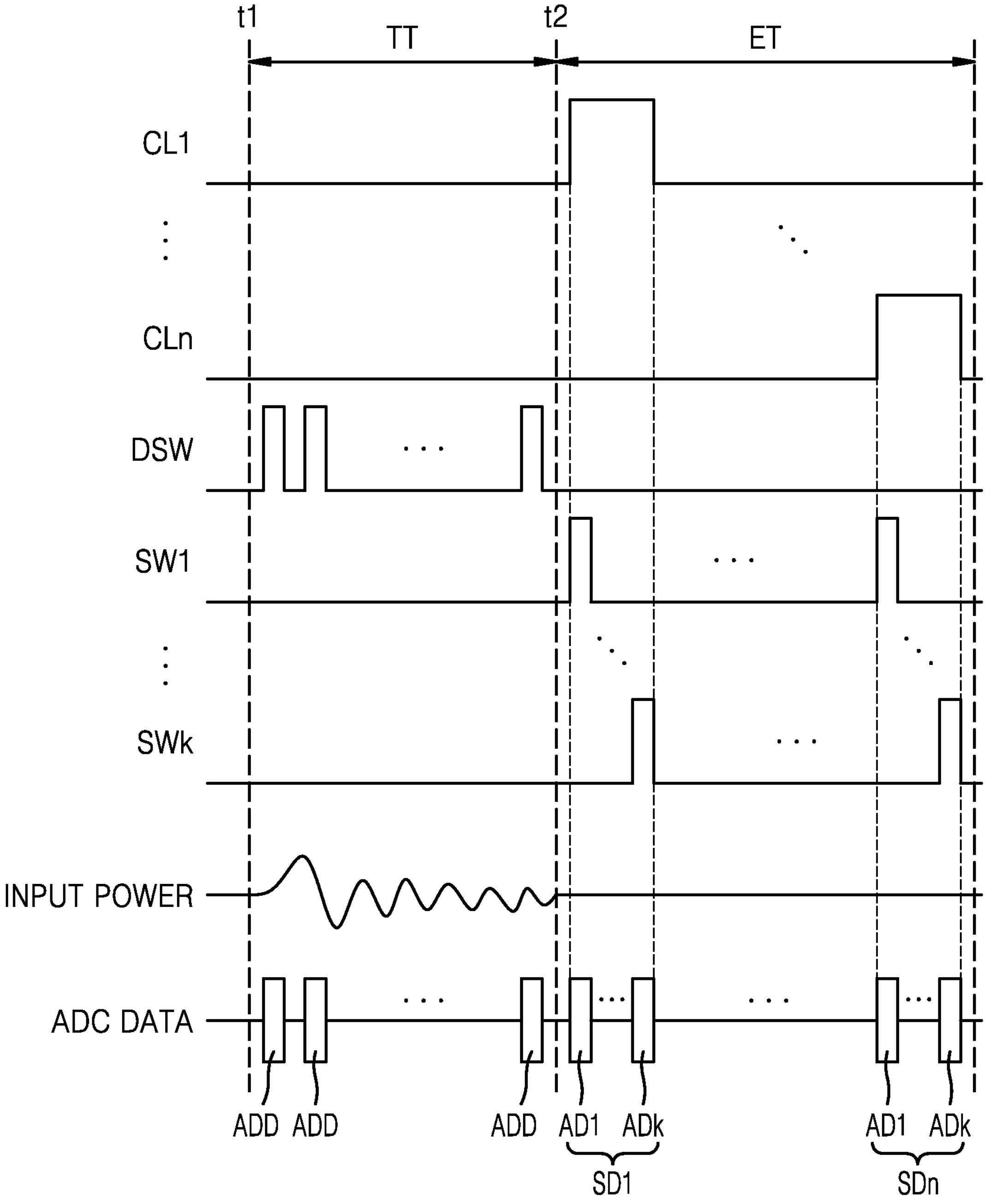
FIG. 14 is a diagram illustrating signals applied during a sensing period in the display device of FIG. 13.

FIG. 13 is a schematic diagram illustrating a portion A of the display device of FIG. 6 according to an embodiment. FIG. 14 is a diagram illustrating signals applied during a sensing period in the display device of FIG. 13.

The embodiment shown in FIG. 13 is different from the embodiment shown in FIG. 11 in that a dummy sensing channel DS-CH is added to the sensor 140.

Referring to FIG. 13, the sensor 140 may include a plurality of sensing channels S-CH1 to S-CHk. The sensor 140 may further include a dummy sensing channel DS-CH including a dummy AFE 142' and a dummy switch DSW between the dummy AFE 142' and an ADC 146. The dummy sensing channel DS-CH may not be connected to a sensing line SL of the display panel 110.

Referring to FIG. 14, the dummy switch DSW of the dummy sensing channel DS-CH may be repeatedly turned on a certain number of times during a transition period TT, and the ADC 146 may repeatedly generate data output from the dummy sensing channel DS-CH as dummy data ADD. In an embodiment, a certain signal may be applied to the dummy AFE 142' of the dummy sensing channel DS-CH. For example, a certain voltage or current corresponding to a reference voltage may be applied to the dummy AFE 142' of the dummy sensing channel DS-CH. The number of times the dummy sensing channel DS-CH is connected to the ADC 146 may be determined according to the length of the transition period TT.

Subsequently, when first to n-th rows R1 to Rn of the display area DA are sequentially selected by a scan signal during an effective period ET, a reference voltage may be applied to data lines DL1 to DLk, and thus, the reference voltage may be applied to pixels P. Furthermore, a control signal may be sequentially applied to control lines CL1 to CLn. The control signal may overlap with the scan signal.

The sensor 140 may not output the dummy data ADD generated by driving the dummy sensing channel DS-CH multiple times during the transition period TT to the compensator 170. The sensor 140 may store sensing data SD1 to SDn generated by sensing pixels P of the first to n-th rows R1 to Rn of the display area DA during the effective period ET in a memory 148 and then output the sensing data SD1 to SDn to the compensator 170.

Figure 15:
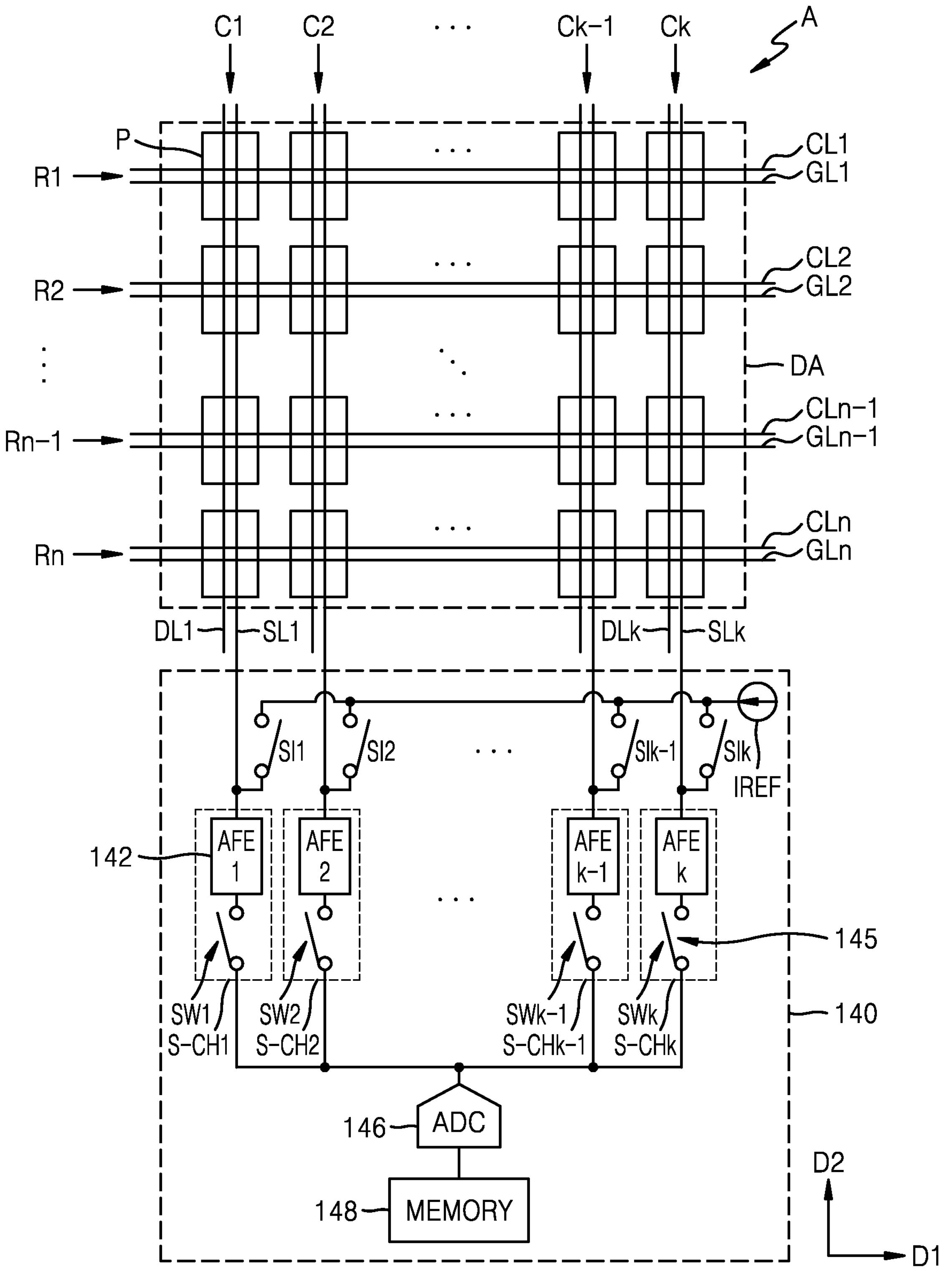
FIG. 15 is a schematic diagram illustrating a portion of the display device of FIG. 6, according to an embodiment.

FIG. 15 is a schematic diagram illustrating a portion A of the display device of FIG. 6, according to an embodiment.

Figure 16:
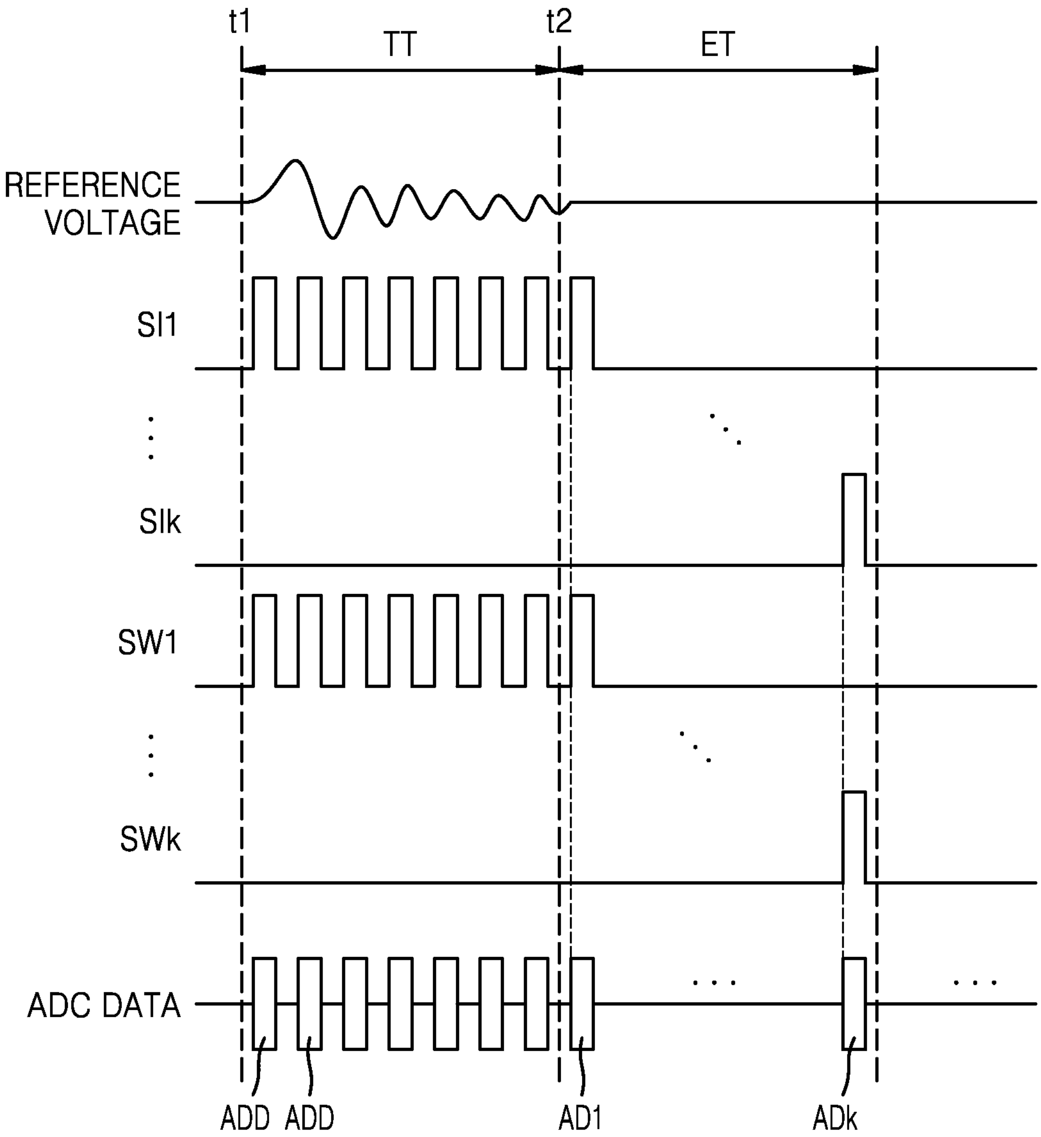
FIG. 16 is a diagram illustrating signals applied during a sensing period in the display device of FIG. 15.

FIG. 16 is a diagram illustrating signals applied during a sensing period in the display device of FIG. 15.

The embodiment shown in FIG. 15 is different from the embodiment shown in FIG. 11 in that the sensor 140 further includes a current source IREF for IC calibration and current switches SI1 to SIk provided between the current source IREF and a plurality of AFEs AFE1 to AFEk.

In an embodiment, the sensor 140 may perform IC calibration during a sensing period. Similar to a transition period when the display panel 110 of FIG. 6 enters a sensing mode, there may be a transition period at the beginning of the IC calibration. The sensor 140 may repeatedly connect a sensing channel to an ADC 146 a certain number of times during a transition period of the sensing period in which IC calibration is performed and may process sensing data generated during the transition period as dummy data. FIG. 16 shows an example in which a first sensing channel S-CH1 is repeatedly connected to the ADC 146 a certain number of times during the transition period.

Referring to FIG. 16, when the display device performs IC calibration the sensor 140 may repeatedly turn on the current switch SI which is connected to the first sensing channel S-CH1 a certain number of times to supply current from the current source IREF to the AFE AFE1 of the first sensing channel S-CH1 during a transition period TT. The sensor 140 may repeatedly connect the AFE AFE1 of the first sensing channel S-CH1 to the ADC 146 a certain number of times by repeatedly turning on a switch SW1 of the first sensing channel S-CH1 a certain number of times in response to the turn-on of the current switch SI1.

Subsequently, the current switches SI1 to SIk may be sequentially turned on during an effective period ET and current from the current source IREF may be provided to each of the AFEs AFE1 to AFEk.

The sensor 140 may convert analog data which is output from the first sensing channel S-CH1 multiple times during the transition period TT into sensing data having a digital format and may process the sensing data as dummy data ADD and not output the dummy data ADD to the compensator 170. The sensor 140 may convert analog data output from first to k-th sensing channels S-CH1 to S-CHk into sensing data AD1 to ADk having a digital format, store the sensing data AD1 to ADk in a memory 148 and then output the sensing data AD1 to ADk to the compensator 170.

In the above-described embodiments, sensing lines are provided for each column, but in other embodiments, a plurality of columns may share one sensing line.

Figure 17:
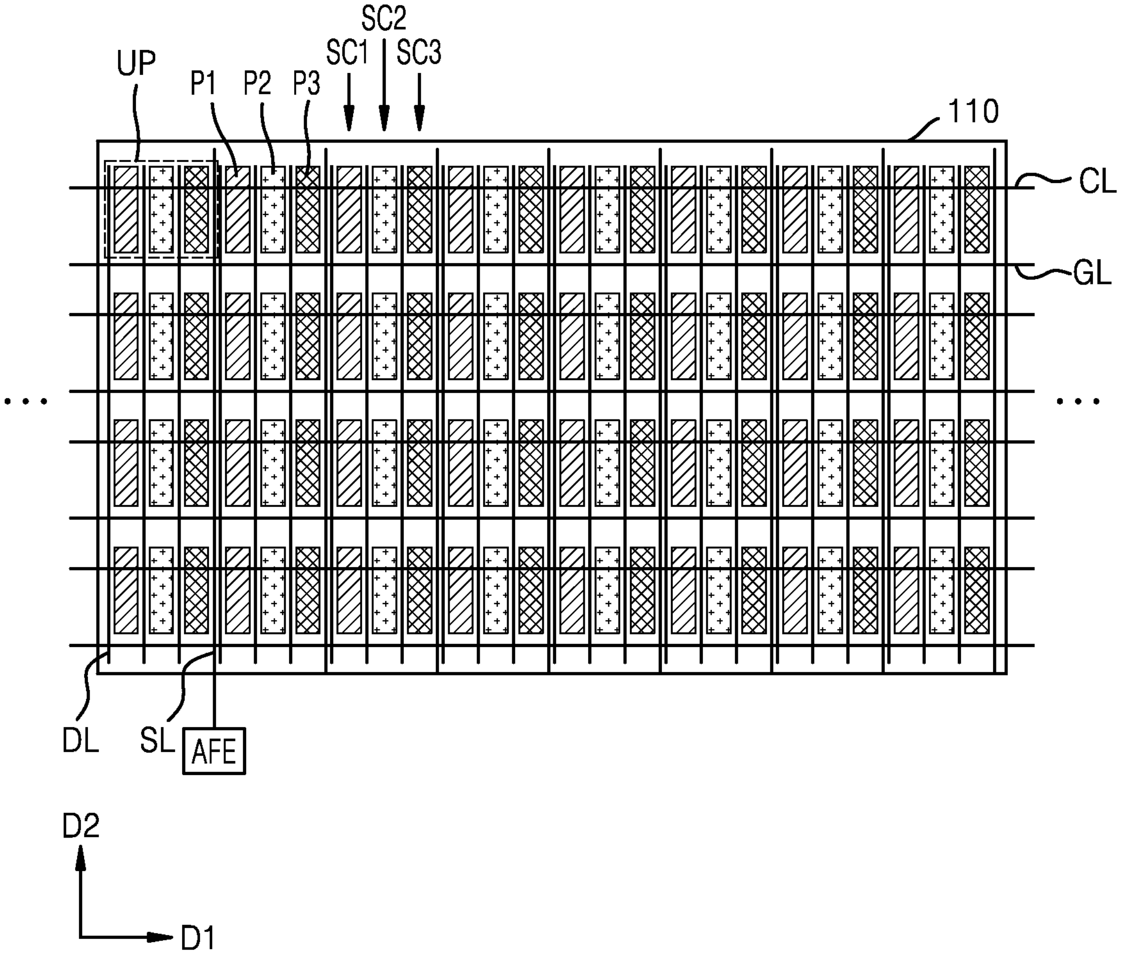
FIG. 17 is a schematic diagram of a display panel according to an embodiment.

FIG. 17 is a schematic diagram of a display panel according to an embodiment.

In the present embodiment, a set of a first pixel P1, a second pixel P2, and a third pixel P3 will be referred to as a unit pixel UP. Each of the first to third pixels P1, P2, and P3 may include a display element. The display element may be connected to a pixel circuit. The display element may include an organic light-emitting diode or a quantum dot organic light-emitting diode.

Referring to FIG. 17, unit pixels UP may be arranged in a first direction D1 and a second direction D2 in the display panel to form a matrix configuration. That is, the first pixel P1, the second pixel P2, and the third pixel P3 may be arranged in the first direction. For example, the first pixels P1 may be arranged in a first sub column SC1, the second pixels P2 may be arranged in a second sub column SC2 adjacent to the first sub column SC1, and the third pixels SP3 may be arranged in a third sub column SC3 adjacent to the second sub column SC2. The first to third sub columns SC1, SC2, and SC3 will be referred to as one column.

Each of the first to third pixels P1, P2, and P3 may be connected to a corresponding scan line among a plurality of scan lines GL and a corresponding data line among a plurality of data lines DL. For example, the first pixel P1 may be connected to a data line DL arranged in the first sub column SC1, the second pixel P2 may be connected to a data line DL arranged in the second sub column SC2, and the third pixel P3 may be connected to a data line DL arranged in the third sub column SC3.

Also, each of the first to third pixels P1, P2, and P3 may be connected to a corresponding control line among a plurality of control lines CL and a corresponding sensing line among a plurality of sensing lines SL. One control line CL may be provided in each row, and the first to third pixels P1, P2 and P3 in the same row constituting the unit pixel UP may share one control line CL. The first to third pixels P1, P2, and P3 that are adjacent in the first direction and constitute the unit pixel UP in each pixel column may share one sensing line SL.

For example, in the sensing period of the first pixel P1, when a scan signal and a control signal are respectively applied to the scan line GL and the control line CL of the k-th row, the second transistor T2 and the third transistor T3 of each of the first to third pixels P1, P2, and P3 of the k-th row may be turned on to charge the capacitor Cst. In this case, a reference voltage may be supplied through the data line DL of the first pixel P1, which is to be sensed, to turn on the first transistor T1 of the first pixel P1, and a voltage (e.g., 0 V) may be applied to the data lines DL of the second pixel P2 and the third pixel P3 to turn off the first transistors T1 of the second pixel P2 and the third pixel P3. Accordingly, one of the first to third pixels P1, P2, and P3 may be selectively connected to the sensing line SL.

According to a display device and its driving method according to embodiments of the disclosure, a partial area (e.g., a dummy area or some rows in a display area) of a display panel may be automatically sensed once or multiple times during a transition period and sensing data obtained by sensing the partial area may be processed as dummy data, and a compensation value may be generated as a result of sequentially sensing the entire display panel one row at a time during an effective period in which input power is stabilized, and thus, more accurate sensing data may be secured.

According to a display device and its driving method according to embodiments of the disclosure, a characteristic deviation between pixels may be effectively compensated for, and thus, an image having a uniform image quality may be displayed.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A display device that is driven to have a driving period and a sensing period including a transition period and an effective period following the transition period, the display device comprising a display panel, the display panel comprising:

a plurality of sensing lines;

a plurality of pixels each connected to a corresponding sensing line among the plurality of sensing lines;

a sensor that obtains dummy data during the transition period and sensing data comprising characteristic information of the plurality of pixels through the plurality of sensing lines during the effective period; and a compensator that converts first data received from an outside of the display device into second data based on the sensing data, wherein the dummy data are not used to convert the first data received from the outside of the display device into the second data.

2. The display device of claim 1, wherein the display panel includes a display area and a non-display area around the display area, the non-display area including a dummy area, and wherein the sensor senses characteristic information of dummy pixels arranged in the dummy area as the dummy data during the transition period.

3. The display device of claim 2, wherein the dummy area includes a plurality of dummy rows, wherein the sensor sequentially senses characteristic information of dummy pixels arranged in the plurality of dummy rows one row at a time as the dummy data during the transition period, and wherein the sensor sequentially senses characteristic information of the pixels arranged in a plurality of rows in the display area one row at a time during the effective period.

4. The display device of claim 2, wherein the dummy area includes one dummy row, wherein the sensor senses characteristic information of dummy pixels arranged in the dummy row multiple times as the dummy data during the transition period, and wherein the sensor sequentially senses characteristic information of the pixels arranged in a plurality of rows in the display area one row at a time during the effective period.

5. The display device of claim 1, wherein the sensor senses characteristic information of pixels arranged in a row of a plurality of rows in a display area of the display panel multiple times as the dummy data during the transition period, and wherein the sensor sequentially senses characteristic information of the pixels arranged in the plurality of rows in the display area one row at a time during the effective period.

6. The display device of claim 1, wherein the sensor does not output the dummy data obtained during the transition period to the compensator.

7. The display device of claim 1, wherein the sensor includes:

a plurality of analog front ends (AFEs) respectively connected to the plurality of sensing lines; and an analog-to-digital converter (ADC) that is sequentially connected to the plurality of AFEs.

8. The display device of claim 7, wherein the AFEs hold characteristic information of pixels in a row in a display area of the display panel, and the ADC sequentially connected to the AFEs to convert the characteristic information of the pixels in the row into digital sensing data.

9. The display device of claim 7, wherein the sensor further includes:

a plurality of first switches provided between each of the plurality of AFEs and the ADC.

10. The display device of claim 9, wherein the sensor further includes:

a dummy analog front end (DAFE) which is not connected to any of the plurality of sensing lines; and a dummy switch provided between the DAFE and the ADC.

11. The display device of claim 10, wherein the sensor connects the DAFE to the ADC multiple times through the dummy switch during the transition period to obtain the dummy data, and wherein the sensor sequentially connects the AFEs to the ADC through the plurality of first switches during the effective period.

12. The display device of claim 9, wherein the sensor further includes:

a current source; and a plurality of second switches provided between each of the plurality of AFEs and the current source.

13. The display device of claim 12, wherein the sensor connects an AFE of the AFEs to the current source multiple times through a corresponding second switch of the plurality of second switches and connects the AFE to the ADC multiple times through a corresponding first switch of the plurality of first switches during the transition period to obtain the dummy data.

14. A display device that is driven to have a driving period and a sensing period including a transition period and an effective period following the transition period, the display device comprising a display panel, the display panel comprising:

a plurality of sensing lines;

a plurality of pixels each connected to a corresponding sensing line among the plurality of sensing lines;

a sensor that obtains dummy data during the transition period and sensing data comprising characteristic information of the plurality of pixels through the plurality of sensing lines during the effective period; and a compensator that converts first data received from an outside of the display device into second data based on the sensing data, wherein the sensor includes:

a plurality of analog front ends (AFEs) respectively connected to the plurality of sensing lines;

an analog-to-digital converter (ADC) that is sequentially connected to the plurality of AFEs; and a current source, and wherein the dummy data are not used to convert the first data received from the outside of the display device into the second data.

15. The display device of claim 14, wherein the AFEs hold characteristic information of pixels in a row in a display area of the display panel, and the ADC sequentially connected to the AFEs to convert the characteristic information of the pixels in the row into digital sensing data.

16. The display device of claim 14, wherein the sensor further includes:

a plurality of first switches provided between each of the plurality of AFEs and the ADC; and a plurality of second switches provided between each of the plurality of AFEs and the current source.

17. The display device of claim 16, wherein the sensor connects an AFE of the AFEs to the current source multiple times through a corresponding second switch of the plurality of second switches and connects the AFE to the ADC multiple times through a corresponding first switch of the plurality of first switches during the transition period to obtain the dummy data.

* * * * *